United States Patent [19]
Yano

[11] Patent Number: 5,864,336
[45] Date of Patent: Jan. 26, 1999

[54] LIQUID CRYSTAL DISPLAY DEVICE

[75] Inventor: Takakazu Yano, Tokyo, Japan

[73] Assignee: Citizen Watch Co., Ltd., Tokyo, Japan

[21] Appl. No.: 39,247

[22] PCT Filed: Feb. 25, 1992

[86] PCT No.: PCT/JP92/00200

§ 371 Date: Apr. 28, 1993

§ 102(e) Date: Apr. 28, 1993

[87] PCT Pub. No.: WO93/17380

PCT Pub. Date: Sep. 2, 1993

[51] Int. Cl.[6] .................................................. G09G 3/18
[52] U.S. Cl. ....................... 345/211; 345/508; 264/707
[58] Field of Search ................................ 345/98, 211, 87, 345/185, 201, 104, 204, 507, 508; 364/707

[56] References Cited

U.S. PATENT DOCUMENTS

| | | | |
|---|---|---|---|
| 4,481,382 | 11/1984 | Villa-Real ................................. | 379/61 |
| 4,483,599 | 11/1984 | MacRae et al. ........................... | 352/22 |
| 5,059,961 | 10/1991 | Cheng . | |
| 5,287,298 | 2/1994 | Urushima ................................. | 364/707 |
| 5,327,503 | 7/1994 | Kiyohara ................................. | 345/104 |
| 5,349,688 | 9/1994 | Nguyen ................................... | 364/707 |
| 5,410,714 | 4/1995 | Yorimoto et al. ........................ | 364/707 |
| 5,493,685 | 2/1996 | Zenda ...................................... | 364/707 |
| 5,515,080 | 5/1996 | Nakamura et al. ....................... | 345/87 |

FOREIGN PATENT DOCUMENTS

| | | |
|---|---|---|
| 0 456 012 A2 | 11/1991 | European Pat. Off. . |
| 51-9540 | 1/1976 | Japan . |
| 0122458 | 6/1985 | Japan ..................................... 364/707 |
| 60-176481 | 11/1985 | Japan . |
| 63-53633 (A) | 3/1988 | Japan . |
| 2-61719 (A) | 3/1990 | Japan . |
| 2-85920 (A) | 3/1990 | Japan . |
| 2130405 | 5/1984 | United Kingdom ................... 364/707 |

OTHER PUBLICATIONS

<<Battery Powered Data Entry Unit>> by L.D. Foster I.B.M. Technical Disclosure Bulletin. vol. 15 No. 11 Apr. 1973 pp. 3437–3438.

*Primary Examiner*—Lun-Yi Lao
*Attorney, Agent, or Firm*—Finnegan, Henderson, Farabow, Garrett & Dunner, L.L.P.

[57] ABSTRACT

The present invention provides a liquid crystal display device which can reduce the power consumption of the display device composed by liquid crystal in personal computers or word processors, and which is constructed such that the image display will not cut off when a user uses it. The liquid crystal device comprises a power source 109, a central processor 101, a liquid crystal display 107, a display image generator 103, a first image display storage 104, a display image data controller 106, an electric power consumption mode switch 108 and an external input 110. In this arrangement, the display image data controller 106 comprises a second image display storage 208 and, in the normal power consumption mode, displays the display image data generated by the display image generator 103 on the liquid crystal display 107 via the first image display storage 104, and in the low power consumption mode, which is set up by operating the electric power consumption mode switch, displays the display image data stored in the second image display storage 208 on the liquid crystal display 107.

7 Claims, 19 Drawing Sheets

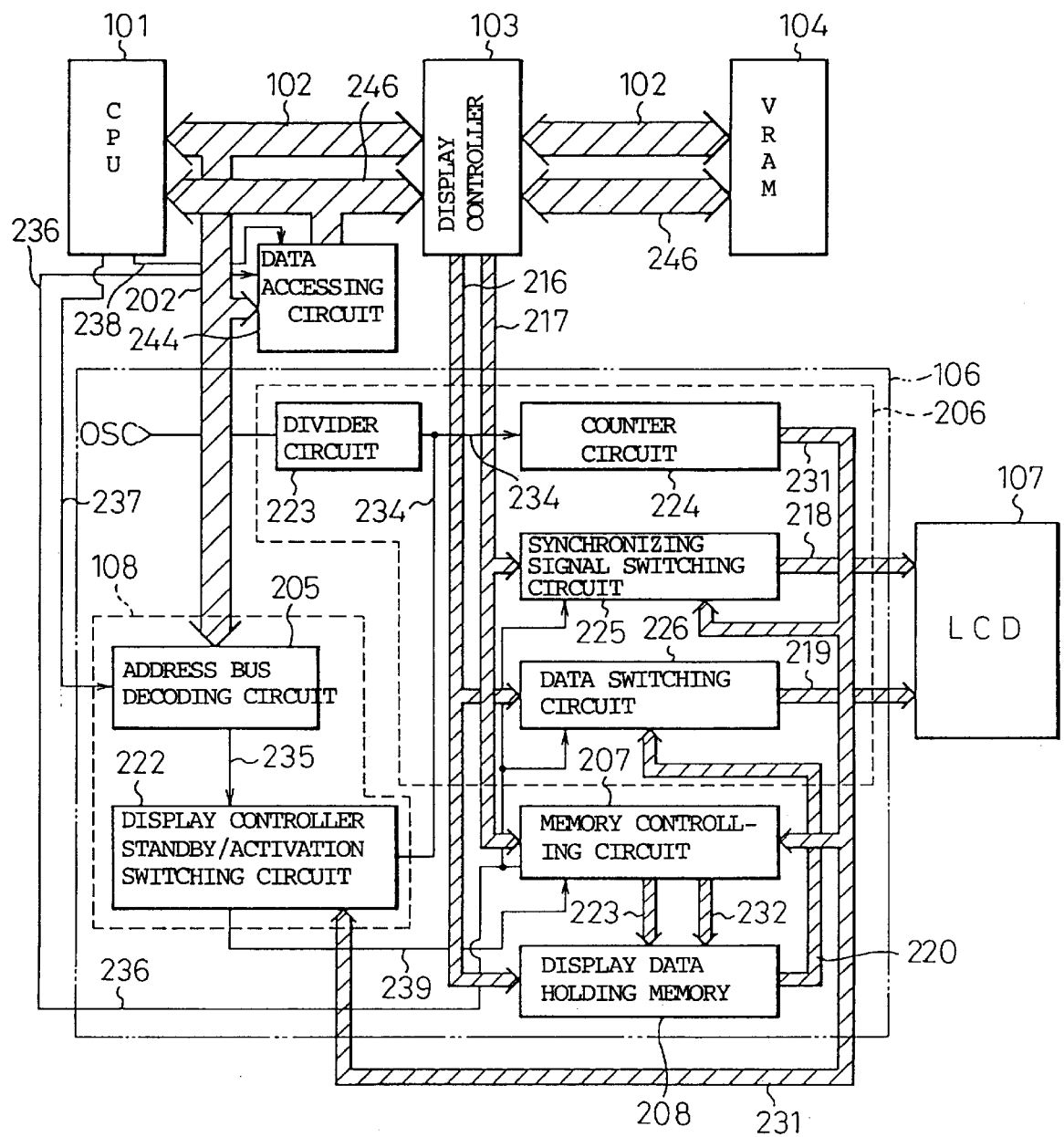

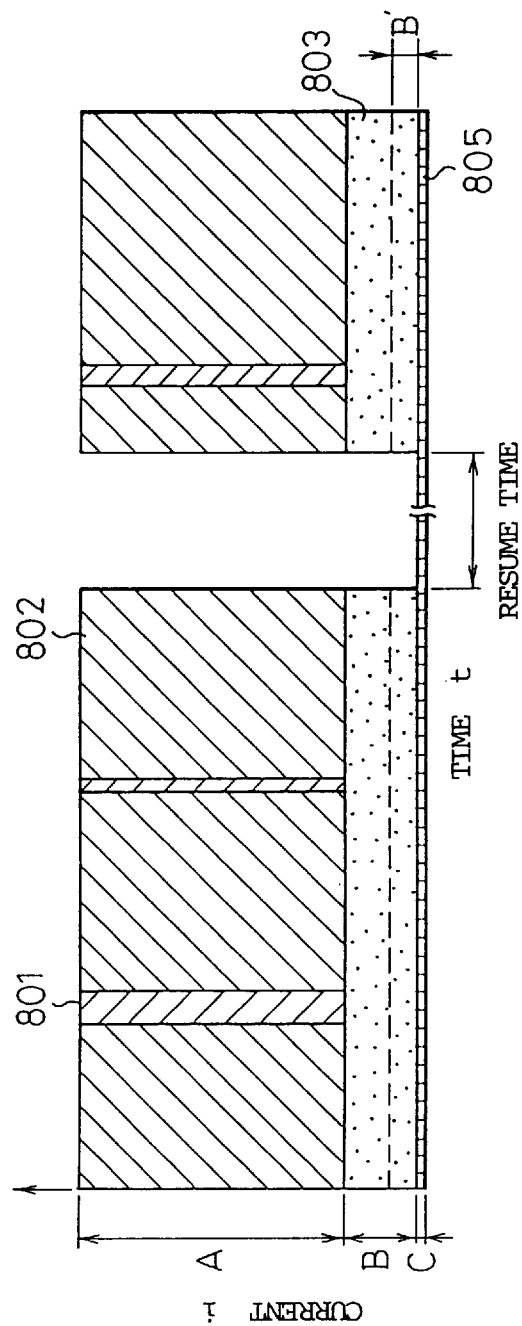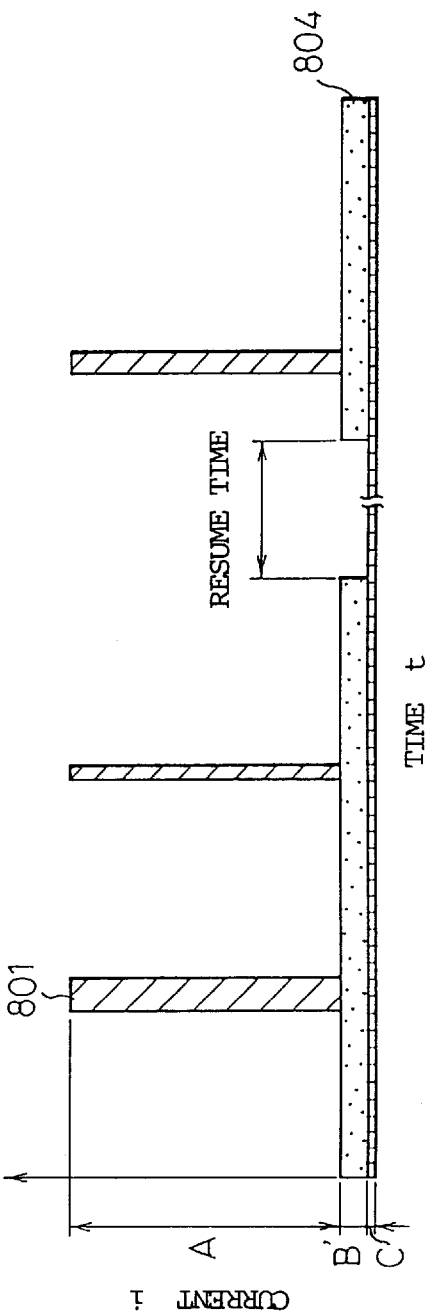

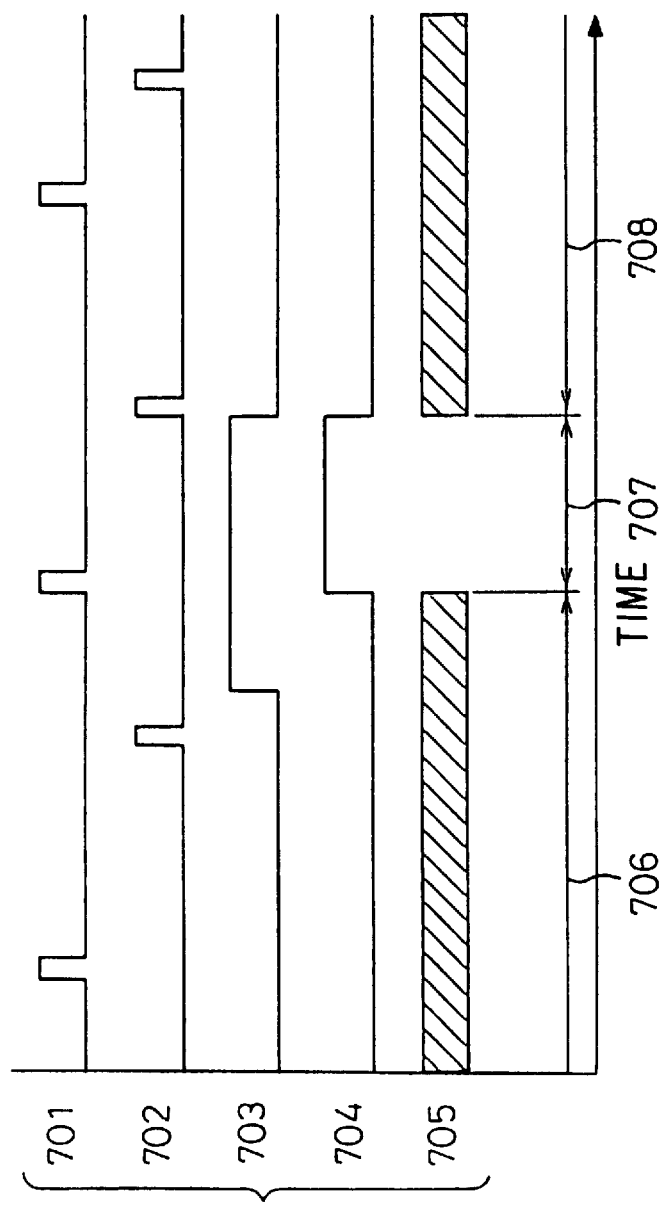

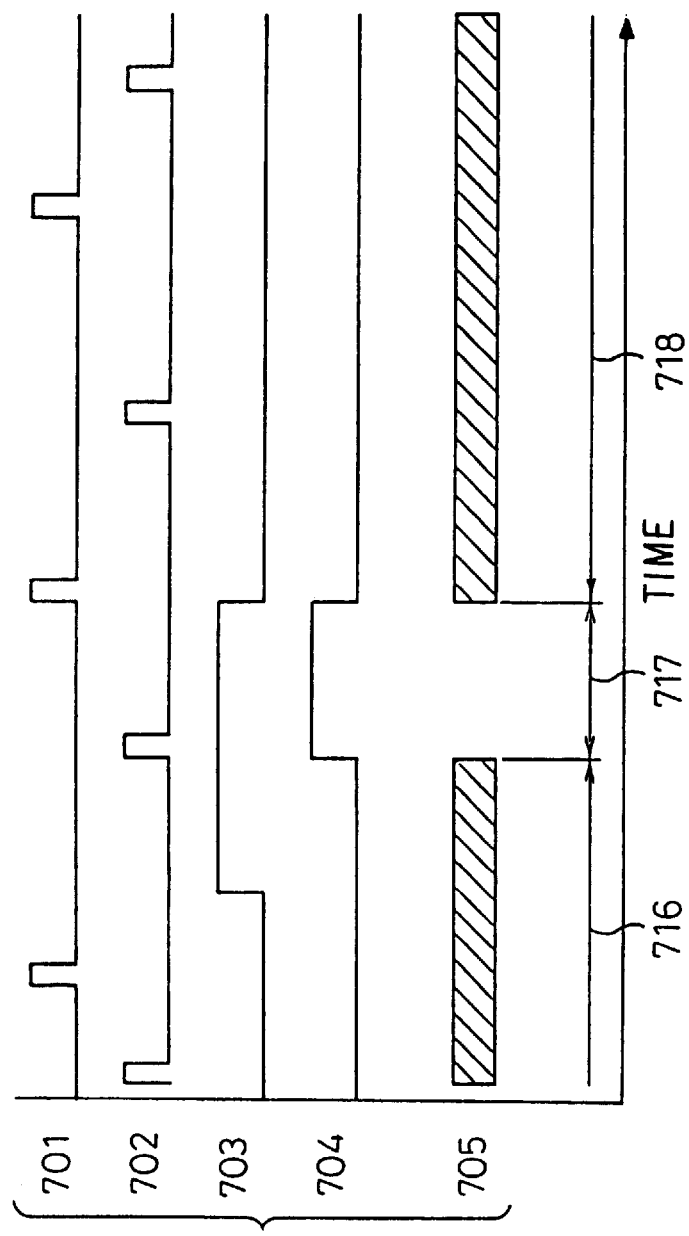

LIQUID CRYSTAL DISPLAY DEVICE

FIELD OF ART

The present invention relates to a liquid crystal display device in personal computers and more particularly relates to a liquid crystal display device equipped with an electric power consumption-reduction function, and providing stable display.

BACKGROUND OF THE INVENTION

Use of lap-top or notebook type personal computers or word-processors, etc., is being developed widely because of their portability. However, there is a common problem with compact type personal computers, that is, the electric power consumption. More specifically, these kinds of personal computers or word-processors, etc., use batteries as a portable power source, but these batteries allow the machine to operate normally for only two to five hours.

To deal with this, there are various measures taken for reducing the electric power consumption in this kind of personal computer.

One example for this measure is that if data is not input from the keyboard for a predetermined time, the operation of the CPU is stopped automatically and the display is turned off so as to reduce the electric power consumption. FIG. 1 shows a block diagram of a display device equipped with this kind of automatic display stop system together with a central processing unit (to be referred to as CPU hereinafter). Here, a display portion comprises a display controller or display image generating means 103 connected to a CPU 101 through a bus line 102, a first image display memory means 104 including a video memory (to be called a VRAM) and a liquid crystal display device (LCD) 107. A T1 measurement circuit 111 starts to measure a constant period of time T1 by means of a counter at the time an interrupt signal INTR 121 input into the CPU 101 changes from high level to low level. If the measurement circuit has finished counting the predetermined time from the count start without receiving a next interrupt signal, the circuit generates a count-up signal 113. With this, a display cut-off circuit 122, in accordance with the count-up signal 113 sent from the T1 measurement circuit 111, sets a signal 114 to high level to cut off the display. In other words, the measurement circuit 111 and the display cut-off circuit 122 constitute an electric power consumption mode switching means 108. Accordingly, the transmission of LCD data 115 and LCD drive signals 116 to a LCD is stopped. A display drive circuit 123, synchronized with the INTR 121 set to a high level after the display cut-off or in the course of counting, sets a signal 112 to high level, resets the counting and causes a signal 114 to be set to low level to operate the display. In FIG. 1, reference numerals 109 and 110 denote a power source and an external input means such as a keyboard, etc., respectively.

The conventional automatic display cut-off system, however, has a problem that if input has not been made for a predetermined period of time, the display is turned off, even when a user is looking at the display.

The present invention is to solve the problem and provide a personal computer or word-processor with which a user can take time to think, and which still prevents battery consumption.

DISCLOSURE OF THE INVENTION

In order to achieve the above object of the present invention, the present invention provides a liquid crystal display device having a technical structure as follows. That is, a display device is composed of a power source, a central processing means, a liquid crystal display means, a display image generating means, a first image display storage means, a display image data controlling means, an electric power consumption mode switching means, external input means and the like. In this arrangement the liquid crystal display device comprises the display image data controlling means which is equipped with a second image display storage means and which, in the normal electric power consumption mode, displays on the liquid crystal display means the display image data generated by the display image generating means via the first image display storage means and in the low electric power consumption mode, stores once the display image data generated by the display image generating means in the second display storage means, thereafter stops driving of the display image generating means, and displays on the liquid crystal display means the display image data stored in the second image display storage means.

BRIEF DESCRIPTION OF THE DRAWINGS

FIG. 4 is a block diagram showing the structure of a third embodiment of a liquid crystal display device according to the present invention.

FIGS. 16(A) and 16(B) are illustrations for explaining the effect of a liquid crystal display device of the present invention.

FIGS. 18 and 19 are timing charts showing operations in a liquid crystal display device of the present invention.

MOST PREFERABLE EMBODIMENTS OF THE INVENTION

Embodiments of liquid crystal display devices of the present invention will be hereinafter described in detail with reference to the drawings.

Figure 2:
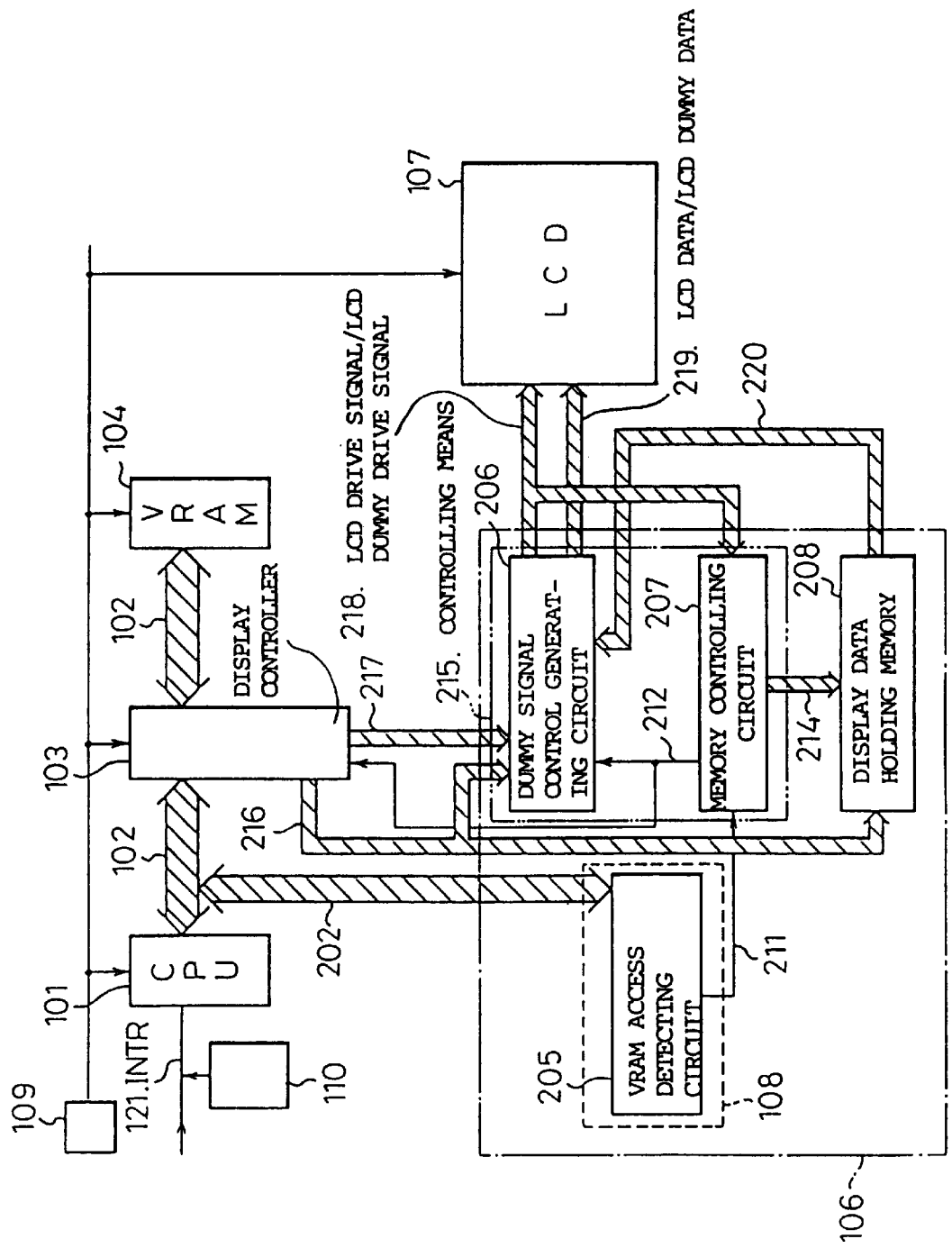
FIG. 2 is a block diagram for illustrating the principle of a liquid crystal display device according to the present invention, and showing the structure of an embodiment of the liquid crystal display device of the present invention.

FIG. 2 is a block diagram for explaining an essential configuration example of a liquid crystal display device of the present invention. In FIG. 2, a display device is composed of a power source 109, a central processing means 101, a liquid crystal display means 107, a display image generating means 103, a first image display storage means 104, a display image data controlling means 106, an electric power consumption mode switching means 108, external input means 110 and the like. In this arrangement the liquid crystal display device comprises the display image data controlling means 106 equipped with a second image display storage means 208 and control means 215 which, in the normal electric power consumption mode, displays on the liquid crystal display means 107 the display image data generated by the display image generating means 103 via the first image display storage means 104 and which, when the mode is replaced with the low electric power consumption mode by operating the electric power consumption mode switching means, displays on the liquid crystal display means 107 the display image data stored in the second image display storage means 208, and which, in the low electric power consumption mode, once stores the display image data generated by the display image generating means 110 in the second display storage means 208, thereafter stops the function for displaying image of the display image generating means 103 from driving, and displays on the liquid crystal display means 107 the display image data stored in the second image display storage means 208.

Figure 1:
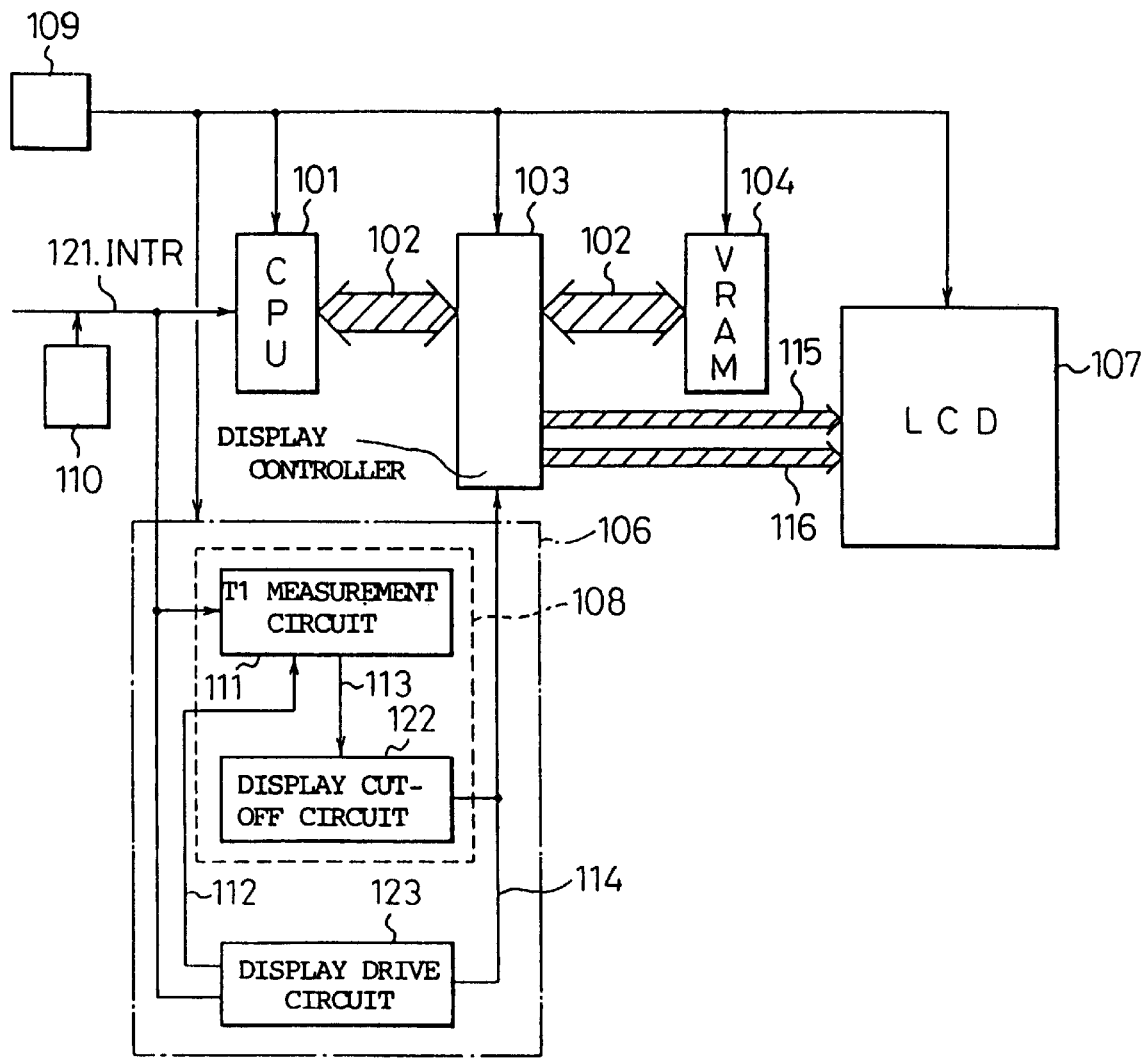
FIG. 1 is a block diagram showing a configuration example of a conventional liquid crystal display device.

That is, according to the prior art device, when executing software like word-processing software waits for a keyboard input, if no input is made for a predetermined period of time, the device stops displaying until an INTR 121 in FIG. 1 becomes high level. Therefore, this stop disturbs a user taking time to consider the phrases. To deal with this, in the present invention, when the device is in the low power consumption mode, the display data holding memory 208 which requires little power is employed to store LCD data 216 and the display image generating circuit 103 which functions as a display controller and requires much power is stopped its function as shown in FIG. 2. And LCD data 219 in the second image display storage means 208 is repeatedly displayed. Accordingly, in a case where a word processor or other means waits a keyboard input, a user can get a view of the display in spite of the device being in the low power consumption mode.

The liquid crystal display device according to the invention will be detailed with respect to the configuration and operations.

At first, a power source 201 for use in the present invention is not specified, it is preferable to employ a d.c. power source such as cells or batteries etc. when the present invention is applied to compact portable type personal computers or word processors.

Also, the structure of the switch for changing over power consumption modes used in the present invention is not specified particularly, as long as the switch is constructed such that the normal power consumption mode and the low power consumption mode can be arbitrarily selected manually or by means of an automatic control. The above mode selection may be effected such that, for example, by detecting an access to the first image display storage means by an external keyboard input via CPU or an access to the first image display storage means during execution of a program such as a table calculation and based upon the frequency of the accesses, it is determined whether the device is to be set to the low power consumption mode or the normal power consumption mode. It is also possible as stated heretofore, that occurrence of an interrupt signal into the CPU is detected and, the mode may be determined based on the frequency of the interrupt.

The switching between the normal power consumption mode and the low power consumption mode may be made by changing the voltage or frequency used.

In the present invention, the power consumption mode switching means 108 installed in the display image data controlling means 106 may comprise, at least, an access detecting means 205 for detecting a state in which a predetermined signal due to an external input means or based on a particular program process, accesses the first image display storage means 104 or the display image generating means 103, a means for calculating the frequency of the accesses per unit time (not shown), a means for comparing the access frequency with a reference value (not shown), such that in a case where the access frequency is less than the reference value, the operation mode is switched from the normal power consumption mode to the low power consumption mode.

It may be also possible to provide a structure which comprises, at least, an interrupt signal detecting means (not shown) for detecting a state in which a predetermined signal due to an external input means or based on a particular program process, interrupts the first image display storage means 104 or the display image generating means 103, a means for calculating the frequency of the interrupt per unit time (not shown), a means for comparing the interrupt frequency with a reference value (not shown), such that in a case where the interrupt frequency is less than the reference value, the operation mode is switched from the normal power consumption mode to the low power consumption mode.

Still, according to one aspect of the present invention, the display image data controlling means 106 further comprises a controlling means 215 composed of a dummy drive signal generating means 206 which generates, in the low electric power consumption mode, a dummy drive signal 218 to the liquid crystal display means 107 in place of the liquid crystal display means drive signal 217 generated by the display image generating means 103 for driving the liquid crystal display means 107; and a memory controlling circuit 207 for controlling the means 206.

The display image data stored in the second image display storage means 208 are displayed on the liquid crystal display means 107 in synchronization with the dummy drive signal 218.

Now, there will be given a description on the operation of the system of an embodiment of the present invention shown in FIG. 2.

According to the present invention, a VRAM access detection circuit 205 constituting a power consumption mode switching means 108 sets a signal 211 toward the memory controlling circuit 207 to high level, or transmits a signal to set up the low power consumption mode, while a CPU 101 does not access a first image display storage means 104. A memory controlling circuit 207, receiving a high level signal from the VRAM access detection circuit 205, makes a display data holding memory 208 store LCD data 216 from the first image display storage means 104 through a display image generating means 103. The memory controlling circuit 207 sends out a high level power consumption mode switching signal 212 to a dummy signal control generating circuit 206 and to the display image generating means 103, in order to stop the function for displaying image of the display image generating means 103 or display controller.

The dummy signal control generating circuit 206, generates a LCD dummy driving signal 218 in place of the stopped display image generating means 103, and reads display data 220 constituting a still image out of the display data holding memory 208 to send it to the liquid crystal display device 107 as readout dummy LCD data 219. Here, the write-in and readout processes for the display data holding memory 208 are carried out by a memory signal 214 which is generated by the memory controlling circuit 207 in accordance with the signal 218.

On the other hand, when the CPU 101 accesses the first image display storage means 104, the VRAM access detection circuit 205 sets to low level a signal 211 toward the memory controlling circuit 207, or generates a signal for setting up the normal power consumption mode.

The memory controlling circuit 207, receiving the low leveled signal 211 from the VRAM access detection circuit 205, transmits a low leveled low power consumption switching signal 212 to the dummy-signal control generating circuit 206 and the display image generating means 103 and drives the display image generating means 103. At the same time, the dummy signal control signal generating circuit 206 changes the dummy drive signal 218 for the LCD drive signal 218 and changes the LCD dummy data 219 to the LCD data signal 219 from the display image generating means 103. In this way, the display data from the display image generating means 103 are output as the display data for LCD.

The display device for personal computers according to the above embodiment, does not cut off the display in the display portion even in the low power consumption mode, so that the user can operate without his consideration disturbed.

Figure 3:
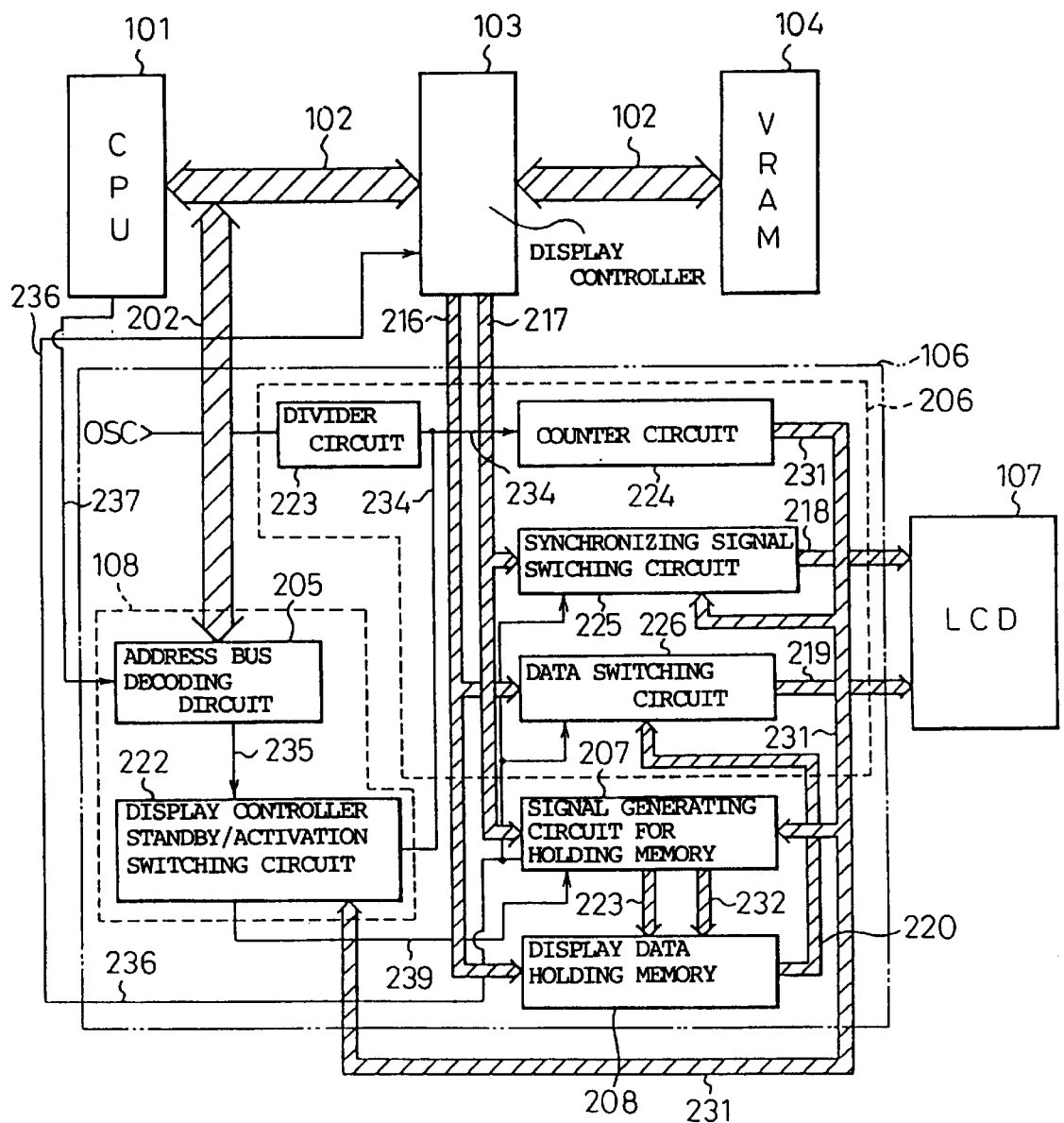
FIG. 3 is a block diagram showing the structure of a second embodiment of a liquid crystal display device according to the present invention.

Another embodiment of the liquid crystal device according to the present invention will be detailed referring to FIGS. 3 and 4.

Both of the embodiments shown in FIG. 3 and FIG. 4 are improvements in terms of functions on the basis of the first embodiment shown in FIG. 2, and therefore the basic circuit structure is the same as shown in FIG. 2.

Accordingly, the same constituents as those in FIG. 2 are identified by the same reference numerals.

That is, the power consumption mode switching means 108 in FIG. 3 comprises an access or interruption detecting circuit 205 and a standby/activation switching circuit 222 for the display image generating means 103. Here, the access or interruption detecting circuit 205 includes, for example, an address bus decoder circuit, and detects whether the central processing unit (CPU) 101 accesses the first image display storage means 104, or whether the central processing unit (CPU) 101 interrupts the display image generating means 103. The standby/activation switching circuit 222 varies its output signal 239 according to the change between H-level and L-level of a signal 235 from the detecting circuit 205.

Here, the switching operation is carried out such that, if the output 239 from the standby/activation switching circuit 222 is for example set at H-level, a controlling circuit 215 is actuated to set up the low power consumption mode, whereas if the output 239 is set at L-level, the display image generating means 103 is actuated to set up the normal power consumption mode.

Figure 5A:
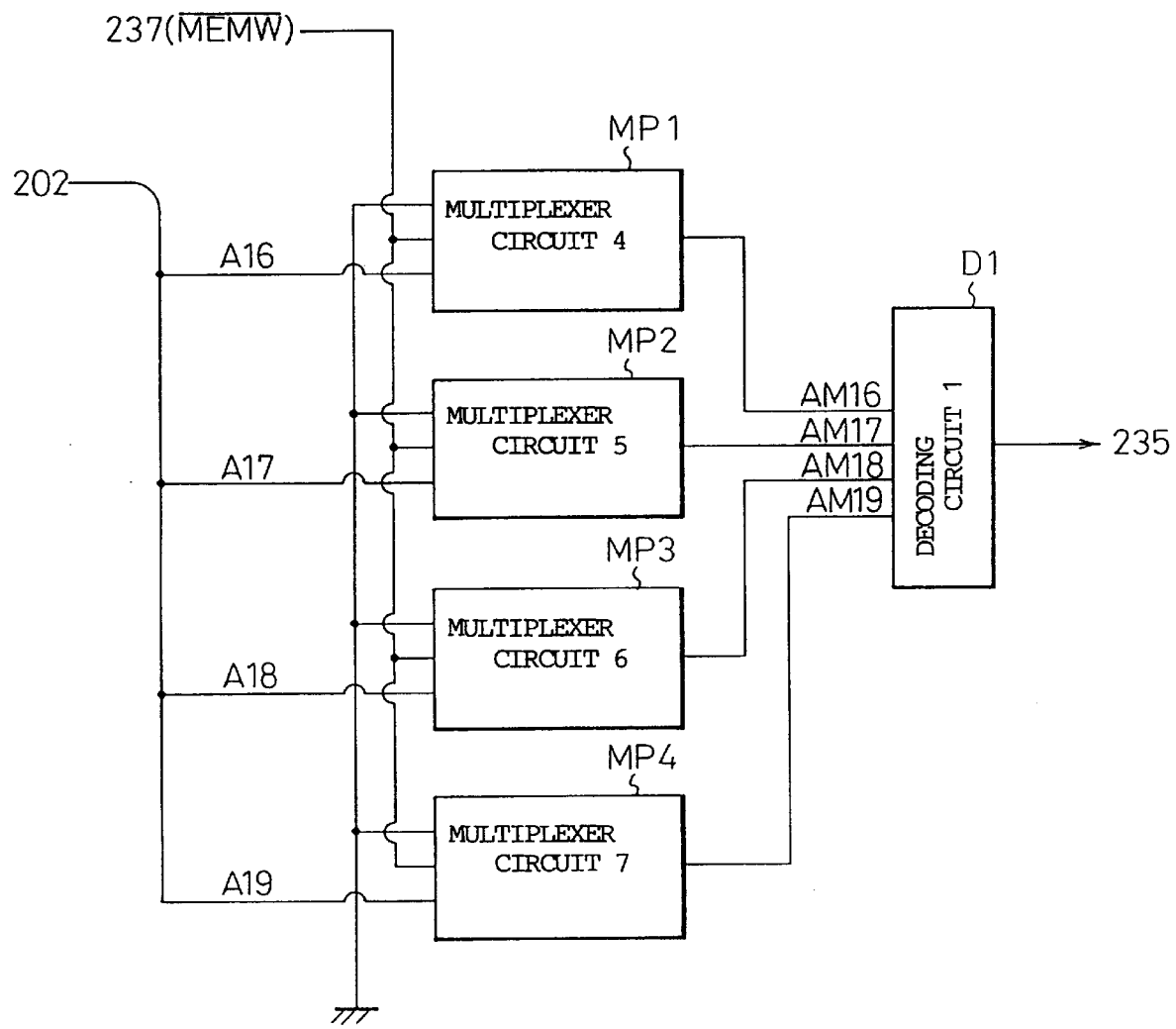
FIG. 5(A) shows an address bus decoder circuit used in a liquid crystal display device of the present invention.

Examples of the address bus decoder 205 and the display controller standby/activation switching circuit 222 used in the present invention are respectively shown in FIGS. 5(A) and (B).

The address bus decoder circuit 205 used in the present invention comprises as shown in FIG. 5(A), address buses A16 to A19, multiplexers MP1 to MP4 and decoding circuit D1, and inputs address buses A16 to A19, and transmits the data to the decoding circuit D1 in time with a timing signal 237 for writing in the memory.

The decoding circuit D1 decodes output signals AM16 to AM19 from the multiplexers MP1 to MP4. If the result belongs to the area of the VRAM 104 of the first image display storage means, the output 235 from the decoding circuit D1 is changed from L-level to H-level.

For example, with respect to MA16 to MA19, in a case where AM16 is H-level, AM17 is at H-level, AM18 is at L-level and AM19 is at H-level, this state is expressed by B in the hexadecimal number system, if the area of this state is determined to belong to the VRAM area previously, in this state the decoding circuit D1 sends out an output 235 at H-level only while the signal 237 from the CPU 101 stays at L-level.

Figure 5B:
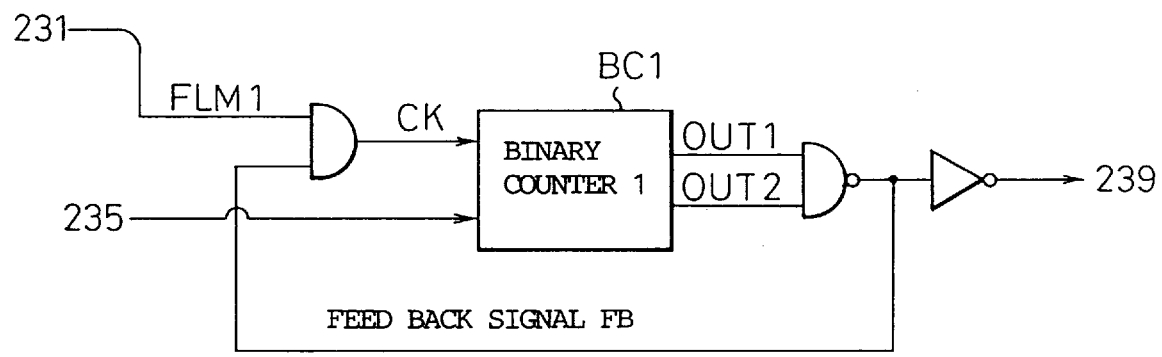
FIG. 5(B) is a block diagram showing an embodiment of a display image generating means standby/activation switching circuit.

On the other hand, the display controller standby/activation switching circuit 222 comprises as shown in FIG. 5(B), an AND gate circuit, a binary counter BC1, a NAND gate circuit and inverters. If the output signal 235 from the address bus decoding circuit 205 is input to the binary counter BC1 at H-level as a reset signal, a feed-back signal FB is set to H-level.

When the reset signal 235 returns to L-level, the binary counter BC1 starts to count the number of FLM1 signals as a clock, i.e., the output 231 from a counter circuit 224. When it reaches a predetermined count number, the output signals OUT1 and OUT2 are simultaneously set to H-level. Accordingly, the feedback signal FB becomes L-level, thus the signal FLM1 is not accepted.

This state will continue until the reset signal 235 next becomes H-level.

It should be noted that an output signal 239 from the display controller standby/activation switching circuit 222 is the inverse of the feedback signal FB.

Meanwhile, in FIG. 3, a dummy signal control generating circuit 206 in the controlling circuit 215 comprises a divider circuit 223, a counter circuit 224, synchronizing signal switching circuit 225 and data switching circuit 226. The divider circuit 223 divides, for example, an oscillating clock input from a proper oscillator OSC into an internal clock 234 having a convenient frequency for the internal circuit.

Figure 6A:
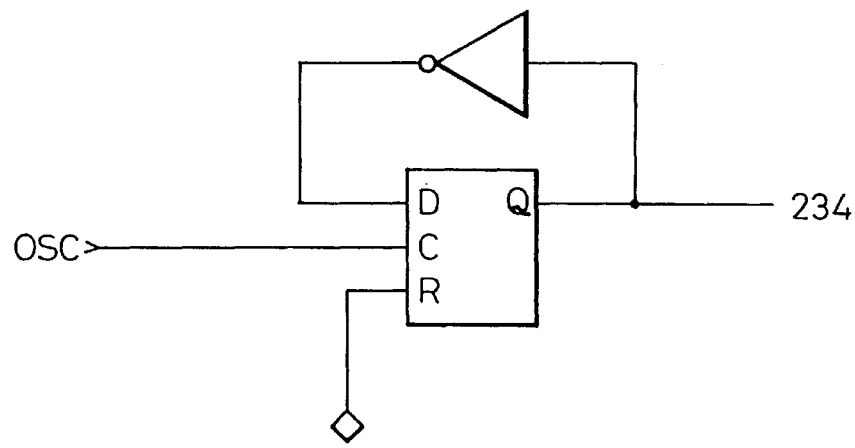
FIG. 6(A) shows a divider circuit used in a liquid crystal display device of the present invention.

As the structure of the divider circuit 223 is not limited particularly, a proper flip-flop circuit in combination with an inverter as shown in FIG. 6(A), for example, can be employed.

The counter circuit 224 periodically generates a dummy synchronizing signal 231 by counting the internal clock 234 to a predetermined number.

In accordance with the internal clock, for example, data may be transmitted with one internal clockcycle, a horizontal synchronizing signal (latch pulse) may be generated having 160 internal clockcycle, and a vertical synchronizing signal may be generated having 240 horizontal synchronizing signals.

Figure 6B:
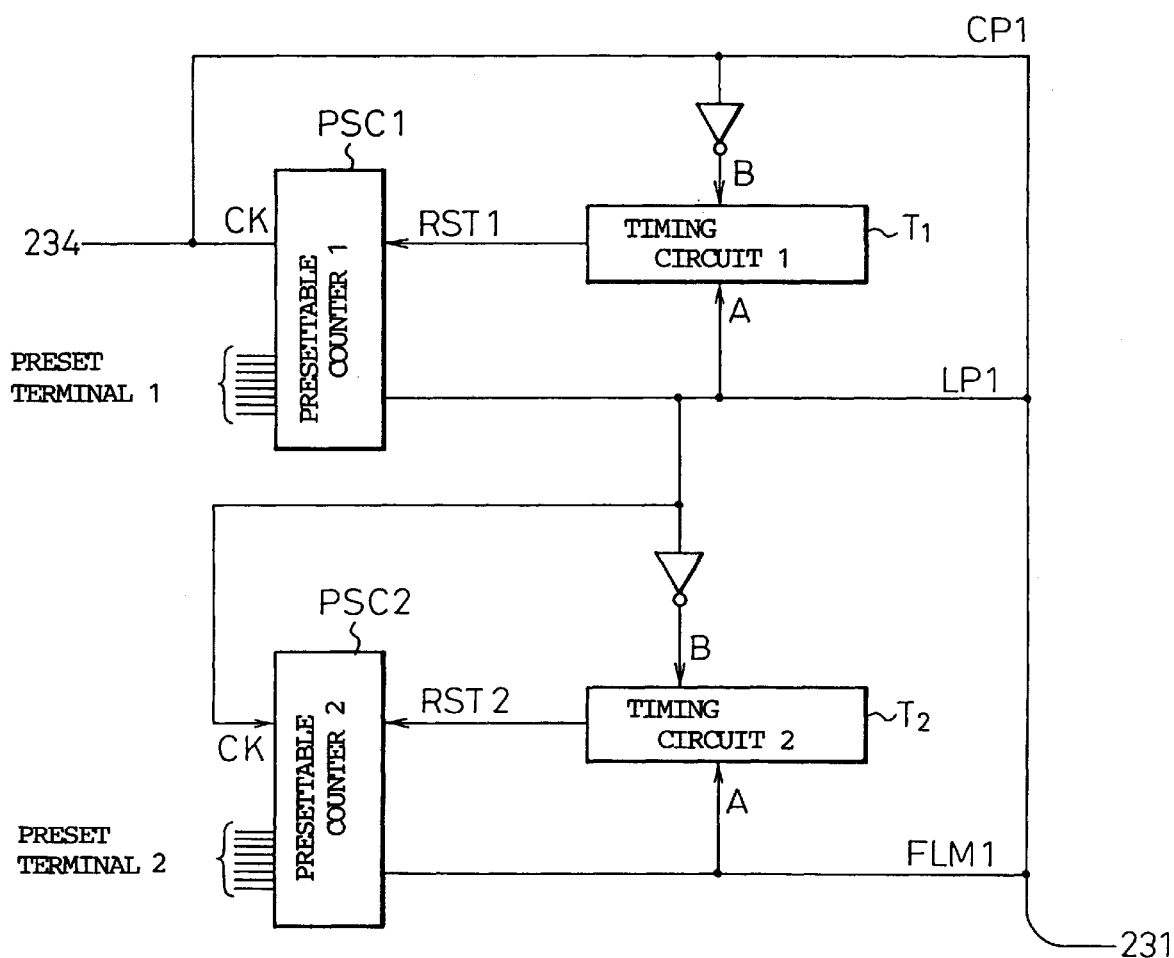
FIG. 6(B) is a block diagram showing an embodiment of a counter circuit.

FIG. 6(A) is a block diagram showing an embodiment of the diving circuit 223 used in the present invention, and FIG. 6(B) is a block diagram showing an embodiment of the counter circuit 224 used in the present invention.

The counter circuit 224 in FIG. 6(B) comprises presettable counters PSC1 and PSC2, and timing circuits T1 and T2. The presettable counter PSC1 inputs the internal clock 234 (usually having a frequency of about 2.5 MHz) and counts it by the number setup by a preset terminal 1, to output an LP1 signal.

The digits of the preset terminal 1 are set to H-level or L-level in accordance with the number to be counted.

For example, if digits 1, 2, 4, 8, 16, 32, and 64 are set to H-level and digit 128 is set to L-level, an LP signal having the same number as input clock-cycles is output after 127 counts.

Each of the timing circuits T1 and T2 of FIG. 6(B) generates an H-level output at a rise of an A input signal and an L-level output at a rise of a B input signal.

In a word, the reset signal of the presettable counter PSC1 is synchronization type, so that the timing circuit is required.

That is, the presettable counter PSC1 is reset at the timing the clock CK rises with the reset signal staying at H-level.

In the same manner, the presettable counter PSC2 generates a signal FLM1 using LP1 as a clock.

It should be noted that the CP1 is a dummy signal for data transmission and the LP1 is a dummy signal for main scanning and corresponds to the horizontal synchronizing signal.

The FLM1 signal is a dummy signal for image flipping and corresponds to the vertical synchronizing signal.

The synchronizing signal switching circuit 225, according to the output 236 from the standby/activation switching circuit 222, changes over the mode between the normal drive signal 217 generated from the display image generating means 103 for the liquid crystal display means 107 and the dummy drive signal 231 generated from the counter circuit 224 for the liquid crystal display means. Thus switched signal is provided as the drive signal 218 for the liquid crystal display means 107.

In short, in the normal power consumption mode, the normal drive signal 217 generated by the display image generating means 103 is provided for the liquid crystal display means 107, whereas in the low power consumption mode, the dummy drive signal 231 output from the counter circuit 224 is provided for the liquid crystal display means 107.

In another embodiment of the liquid crystal display device of the present invention, it is possible to always display on the liquid crystal display means 107 a still image data stored in the display data holding memory 208 as the second image display storage means, in place of displaying the code data stored in the first image display storage means even in the normal power consumption mode. In this case, the synchronizing signal switching circuit 225 becomes unnecessary.

On the other hand, the data switching circuit 226, in accordance with the output 236 from the standby/activation circuit 222, changes over the mode between the signal 216 representing the display image data stored in the first image display storage means 104 output from the display image generating means 103 and the signal 220 representing a still display image data stored in the second image display storage means 208. In other words, in the normal power consumption mode, the data stored in the first image display storage means 104 are provided as display image data 219 for the liquid crystal display means 107. Meanwhile, in the low power consumption mode, the still display image data stored in the second image display storage means 208 are provided as the display image data 219 for the liquid crystal display means 107.

In the same manner as above, in another embodiment, it is possible to always display on the liquid crystal display means 107 a still image data stored in the display data storage memory 208 as the second image display storage means, in place of displaying the code data stored in the first image display storage means even in the normal power consumption mode. In this case, the data switching circuit 226 becomes unnecessary.

Further, this embodiment includes a signal generating circuit for holding memory 207, which corresponds to the memory controlling circuit 207 of the embodiment shown in FIG. 2. This circuit 207, in response to a signal 217 sent out from the display image generating means 103, sends out for the second image display storage means 208 a synthesizing signal 232 for writing the display image data stored in the first image display storage means 104 into the second image display storage means or display data holding memory 208, using the image data signal 216 sent out from the display image generating means 103. Moreover, the circuit 207, in response to a controlling signal 231 output from the counter circuit 224, sends out for the second image display storage means 208 a synchronizing signal 233 for reading the image data out of the second image display storage means 208.

With these processes, the display image data stored in the second image display storage means 208 are provided for the liquid crystal display means 107 via the data switching circuit 226.

In this embodiment, there exists a duration in which the reading signal and the writing signal are generated simultaneously in the embodiment in which the data stored in the second image display storage means 208 are always used for display.

Figure 7A:
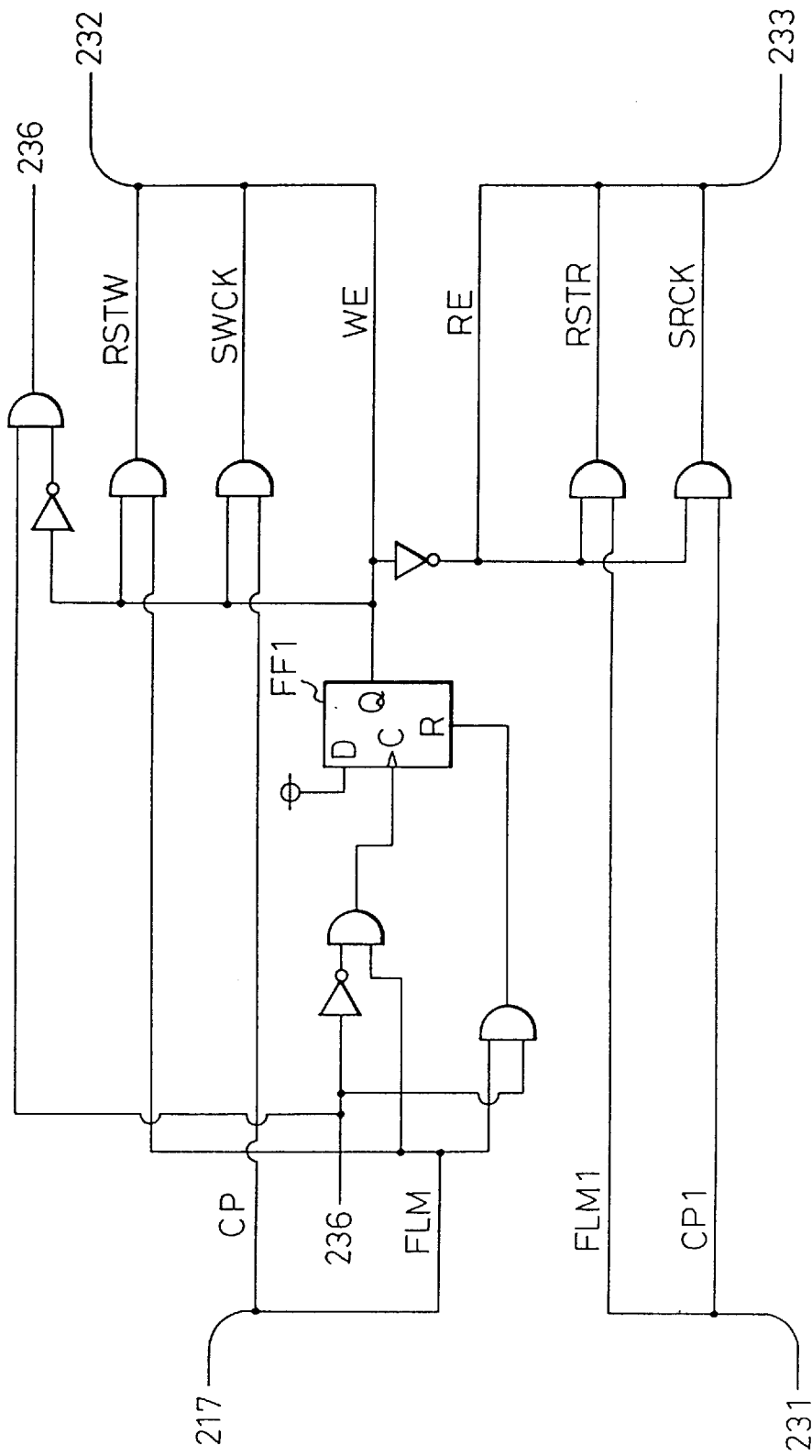
FIG. 7(A) is a block diagram showing an embodiment of a signal generating circuit for holding memory, that is, a signal generating circuit for second image display storage means used in a liquid crystal display device of the present invention.
Figure 7B:
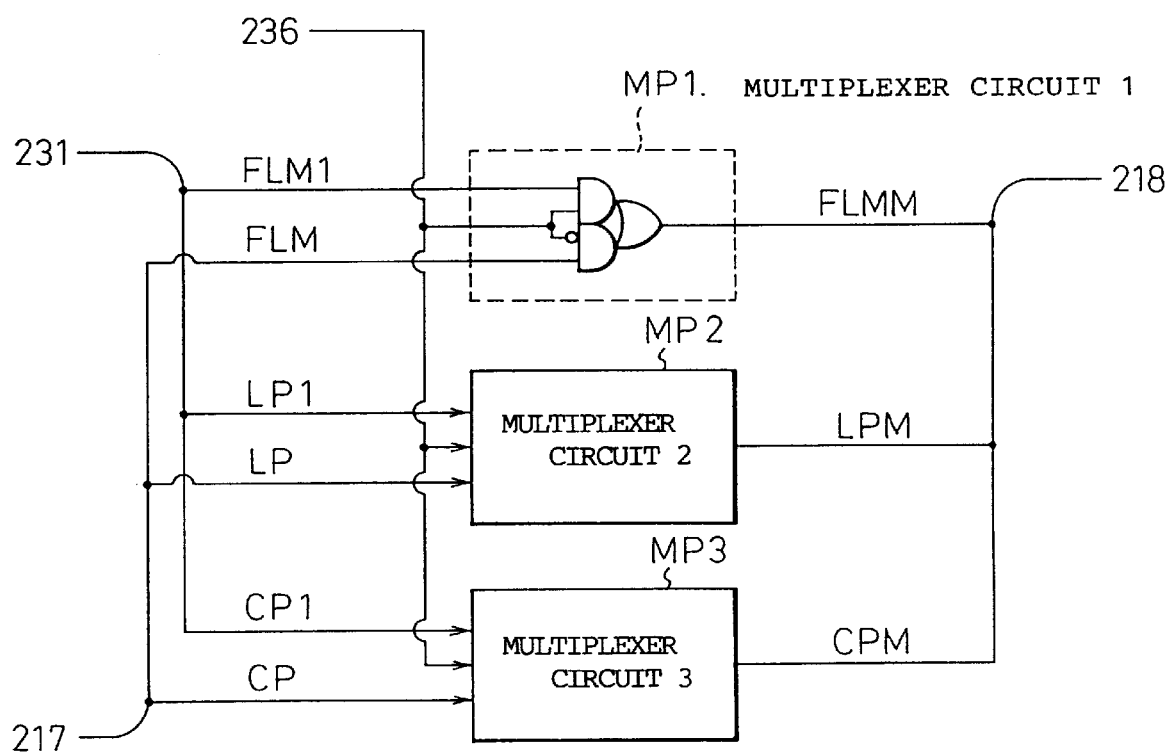
FIG. 7(B) is a block diagram showing an embodiment of a synchronizing signal switching circuit of the same device.

FIG. 7(A) shows a block diagram of an embodiment of the signal generating circuit for holding memory 207 as the second image display storage means used for the liquid crystal display device of the present invention, and FIG. 7(B) shows a block diagram of an embodiment of a synchronizing signal switching circuit 225 used for the liquid crystal display device of the present invention.

The signal generating circuit for holding memory 207 applicable to the present invention, comprises as shown in FIG. 7(A), a flip-flop, AND gate circuits, inverter circuits. This circuit 207 generates a write-enable signal WE at H-level at the time the signal FLM rises under the condition of the output signal 239 from the display controller standby/activation switching circuit 222 being at L-level, and generates a write-enable signal WE at L-level at the time the signal FLM rises under the condition of the output signal 239 being at H-level.

In addition, the reversed signal is defined to be a read-enable signal RE.

When the content of the holding memory is displayed, the read-enable signal RE is fixed at H-level.

Under the condition that the write-enable signal WE is at H-level, a signal RSTW based on the signal FLM and a signal SWCK based on the signal CP are sent out.

On the other hand, under the condition that the read-enable signal RE is at H-level, a signal RSTW based on the signal FLM1 and a signal SRCK based on the signal CP1 are generated.

Here, the signal RSTW is a memory address resetting signal for write-data, whereas the SWCK signal is a data transmission signal for write-data.

The signal RSTR is a memory address resetting signal for read-data, whereas the signal SRCK is a data transmission signal for read-data.

A periodic signal switching circuit 225 applicable to the present invention comprises, as shown in FIG. 7(B), multiplexers MP1 to MP3, and changes over via the multiplexers MP1 to MP3 between the synchronizing signal 217 from the display controller 103 and the dummy synchronizing signal 231 generated from the counter circuit 224, according to the control signal 236 sent out from the signal generating circuit for holding memory 207.

When the controlling signal 236 is at H-level, the multiplexer MP1 sends out the signal FLM1 as the signal FLMM and when the controlling signal 236 is at L-level, the multiplexer MP1 sends out the signal FLM as the FLMM signal.

The other multiplexers MP2 and MP3 operate in the same manner.

In a case where the data in the display data holding memory are displayed at all times, the controlling signal 236 is always fixed at H-level.

Here, the signal FLM is a signal for changing an image (corresponding to the vertical synchronizing signal), the signal LP is a line scanning signal (corresponding to the horizontal synchronizing signal), and the signal CP is a signal for data transmission.

As the liquid crystal display means 107 applicable to this embodiment is not specified particularly, commercially sold liquid crystal display devices may be used, for example, a VGA display specified by IBM (640×480 pixels 320 Kbits), a CGA display specified by IBM Co. (640×200 pixels 130 Kbits) etc. can be used as the liquid crystal display means.

As for the display image generating means 103 applicable to the present invention, CL-CD610/620 (standby mode) made by Cirrus Logic Inc. and 82C455 made by CHIPS and Technologies Inc. (relax mode), for example, can be used.

Further, with respect to the central processing unit (CPU) for use in the present invention, the configuration thereof is not limited specifically, and any currently available CPU is applicable, for example, the 80386 made by Intel.

With respect to the second image display storage means 208 used in the present invention, the configuration thereof is not specified particularly, so that well known currently sold memories may be used. Examples include FIFO memory.MSM514221A (1 Mbits, 1000 Kbits) made by Oki Electric Industry Co., Ltd., and FIFO memory TMS4C1050 (1 Mbits, 100 Kbits) made by Texas Instruments Inc.

The first image display storage means 104 used in the present invention is not limited specifically either, and current commercially available memory may be used such as, for example, a normal dynamic RAM.

FIG. 4 shows a third embodiment of the liquid crystal display device of the present invention. The configurations are basically the same with those of the liquid crystal display device shown in FIG. 3, but this embodiment exemplifies that the display image generating 103 is controlled by software to switch the power consumption modes.

That is, in FIG. 4, a data access circuit 244 is further provided, which is disposed between the address bus 202 and a newly provided data bus 246 between the central processing means 101 and the display image generating means 103. When the CPU designates an arbitrary address, the data access circuit 244 detects the designated address periodically based upon the software, and if, for example, an indication of a predetermined address does not reach a predetermined number of times within a unit time, a predetermined output is made to the data bus 246 in accordance with the result, so that the power consumption mode of the display image generating means 103 is changed over.

Figure 8A:
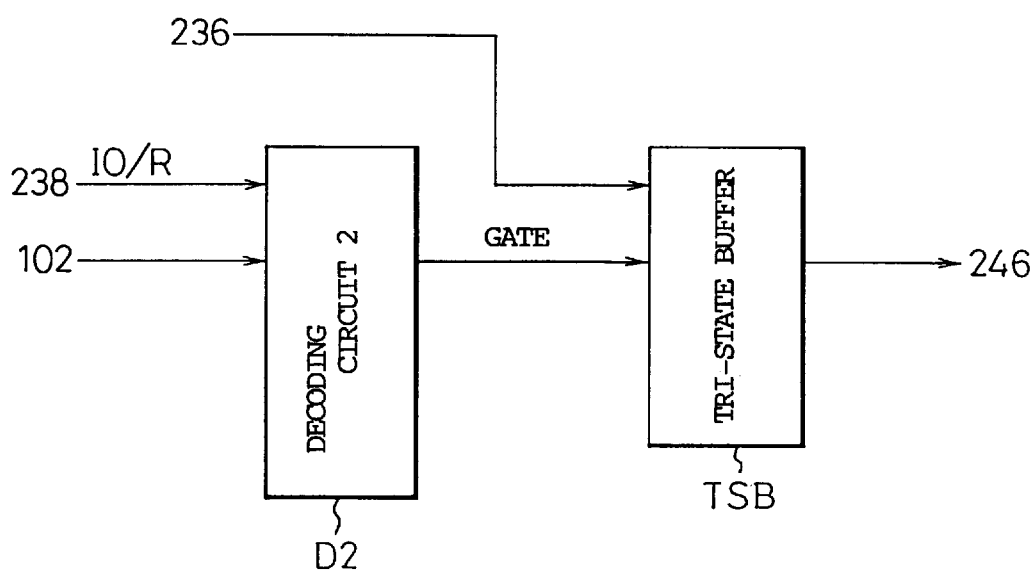
FIG. 8(A) is a block diagram showing an embodiment of a data accessing circuit used in a liquid crystal display device of the present invention.

FIG. 8(A) shows a block diagram of a practical configuration of the data access circuit 244 used for the above embodiment of the liquid crystal display device according to the present invention.

The data access circuit 244 comprises, as shown in FIG. 8(A), a decoding circuit D2 and a tri-state buffer circuit TSB, and decodes the address bus 102 by means of the decoding circuit D2. When the decoded address is an arbitrary one, a gate signal, i.e. the output of the decode circuit D2 is set to H-level, and the signal is accepted by the tri-state buffer circuit TSB, which in turn opens the gate to short the control signal 236 with arbitrary bits of the data bus.

On the contrary, if the address is a predetermined one, the aforementioned switching of the power consumption mode is executed by means of the newly provided data bus 246.

The decoding timing is in accordance with a signal 238 generated at a time when IO memory space is read out.

Figure 8B:
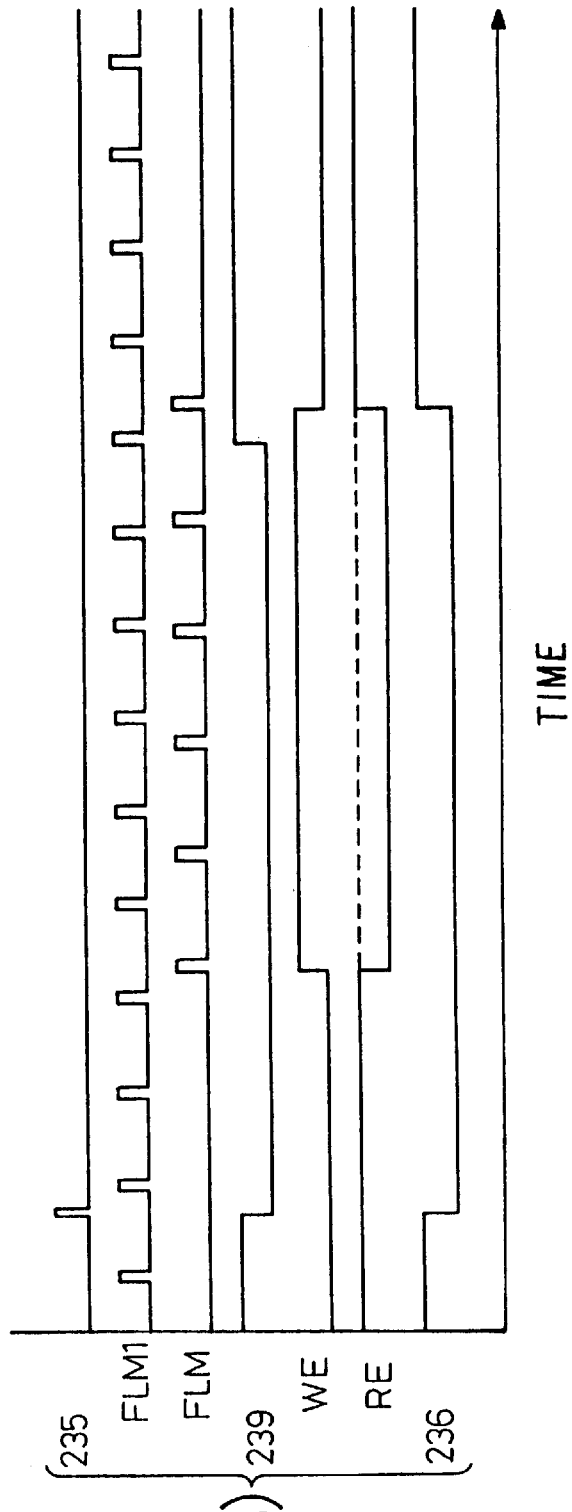
FIG. 8(B) is a view showing waveforms relating to the data accessing circuit.

FIG. 8(B) shows waveforms of an output 235 of the address bus decoding circuit 205, the output signal 239 from the display controller standby/activation switching circuit 222, the output signal 236 from the signal generating circuit for holding memory 207, the image changing signals FLM and FLM1, the write-enable signal WE, and the read-enable signal RE in the liquid crystal display device according to the present invention.

That is, according to the present invention, if the CPU, etc., accesses the VRAM area 104, the output signal 235 from the address bus decoding circuit 205 is set to H-level.

The output signal 239 from the display controller standby/activation switching circuit 222 becomes L-level simultaneously with the output 235 from the address bus decoding circuit 205 transferring to H-level, and will return to H-level after a predetermined number of the dummy signals FLM1 are counted.

The write-enable signal WE is set to H-level at a time when the image changing signal FLM rises under the condition that the output signal 239 from the display controller standby/activation switching circuit 222 remains at L-level, and the write-enable signal WE is set to L-level at time when the signal FLM rises under the condition that the signal 239 remains at H-level.

On the other hand, the read-enable signal RE takes a state opposite to that of the write-enable signal WE or, remains at H-level.

The output signal 236 from the signal generating circuit for holding memory 207 is made by an AND operation of the signal 239 and the revered signal of the write-enable signal WE.

While the signal 236 stays at L-level, the generation of the signal FLM is assured, which indicates that the display controller standby/activation switching circuit 222 is actuated.

Practical use of the liquid crystal display device according to the present invention will be described next. The present invention may be applied as follows by using combinations of various functions of the present invention.

(1) A method in which image data based on the data generated from the display image generating circuit 103 and stored in the first image display storage circuit 104 in the normal power consumption mode are displayed on the display device in accordance with the synchronizing signal generated from the display image generating circuit 103, and the image data is stored in the second image display storage circuit 208 as the still image data, may be realized.

(2) A method in which, in the low power consumption display mode, the still data stored in the second image display storage circuit 208 are displayed continuously on the display device 107 in accordance with the newly generated dummy synchronizing signal from the dummy signal control generating circuit 206, and the operation of the display image generating circuit 103 is stopped, may be realized.

(3) A method in which, upon the changeover from the low power consumption display mode to the normal power consumption display mode, the still image data stored in the second image display storage circuit 208 are continuously displayed on the display device 107 in accordance with the newly generated dummy synchronizing signal, and simultaneously synchronizing signal 217 generated from the display image generating circuit 103 and an image data 216 based on the data stored in the first image display storing circuit 104 are transmitted to the image circuit, may be realized.

(4) A method in which, upon the changeover from the normal power consumption display mode to the low power consumption display mode, image data based on the data generated from the display image generating circuit 103 and stored in the first image display storage circuit 104 is displayed on the display device 107 in accordance with the synchronizing signal generated from the display image generating circuit 103, and the still image data stored in the second image display storage circuit 208 are output in accordance with the newly generated dummy synchronizing signal, may be realized.

(5) A method in which a detecting means 108 for detecting whether the central processing unit (CPU) 101 accesses the first image display storage circuit 104 or the display image generating circuit 103 is provided and based on the detection frequency by the detecting means 108, the operation is changed over between the normal power consumption display mode and the low power consumption display mode, may be realized.

(6) A method in which a detecting means 108 for detecting an interrupt signal to the central processing unit (CPU) 101 is provided, and based on the detection frequency by the detecting means 108, the operation is changed over between the normal power consumption display mode and the low power consumption display mode, may be realized.

(7) A method in which a detecting means 108 for detecting whether the central processing unit (CPU) 101 accesses the first image display storage circuit 104 or the display image generating circuit 103 is provided and based on the detection frequency by the detecting means 108, the stop and drive of the CPU 101 is switched or the drive frequency of the CPU 101 is changed in addition to the low power consumption display mode, may be realized.

(8) A detecting means 108 for detecting an interrupt signal to the central processing unit (CPU) 101 is provided, and based on the detection frequency by the detecting means 108, the stop and drive of the CPU 101 is switched or the drive frequency of the CPU 101 is changed in addition to the low power consumption display mode.

(9) In the normal power consumption display mode, the still image data stored in the second image display storage circuit 208 are displayed continuously on the display device 107 in accordance with the dummy synchronizing signal generated in the dummy signal generating circuit 206, and the image data generated from the display image generating circuit 103 are stored in the second image display storing circuit 208 in accordance with the synchronizing signal.

In the above operations of the present invention, the electric current in the entire liquid crystal display device may be divided into three kinds, namely current for system portion A, current for display B, current for holding C. From this view point, these three kinds of current relative to time t can be represented as schematically shown in FIG. 16a. If no measure for saving power is taken, the current A+B+C flows at all times. Here the most dominant current is the current for system operating (about four times that for display operation), which can be saved by halting and resuming the operation in accordance with the demands of the software and user. In practice, there are some products using detection by OS, bus detection and the like. FIG. 16B is a schematic diagram showing an ideal case for saving energy in which the system is halted strictly according to the demands of the software and user. Here, if, after the completion of saving the energy of the system portion, further energy saving is to be considered, saving the energy in the display portion has a large influence on the energy saving of the entire system. That is, although only the saving in the system portion may make the operation time of the entire system at most several times longer, the additional saving in the display portion can make the time longer by two orders of magnitude.

In view of the effects discussed above, the present system is directed to provide a method for reducing the power without eliminating the display on the display portion. In the normal mode in the system, while the LCD data 219 sent out from the display image generating circuit 103 in FIG. 2 are being displayed in accordance with the LCD synchronizing signal 218, the LCD data 219 are stored by the holding memory circuit 208. When it comes to the saving mode, the display image generating circuit 103 which wastes much energy for executing operations based upon the data of VRAM 104, is, as shown in FIG. 2, halted, and in its place, the LCD support data 220 in the support memory 208, which needs little energy, will be repeatedly displayed. These two modes are changed over by, for example, employing the normal mode when the VRAM 104 is rewritten and using the saving mode for the other cases. In relation to the word-processing software, little time is needed to access the VRAM 104, so that the system can be used in the saving mode for almost all time, resulting in high efficiency.

Figure 9:
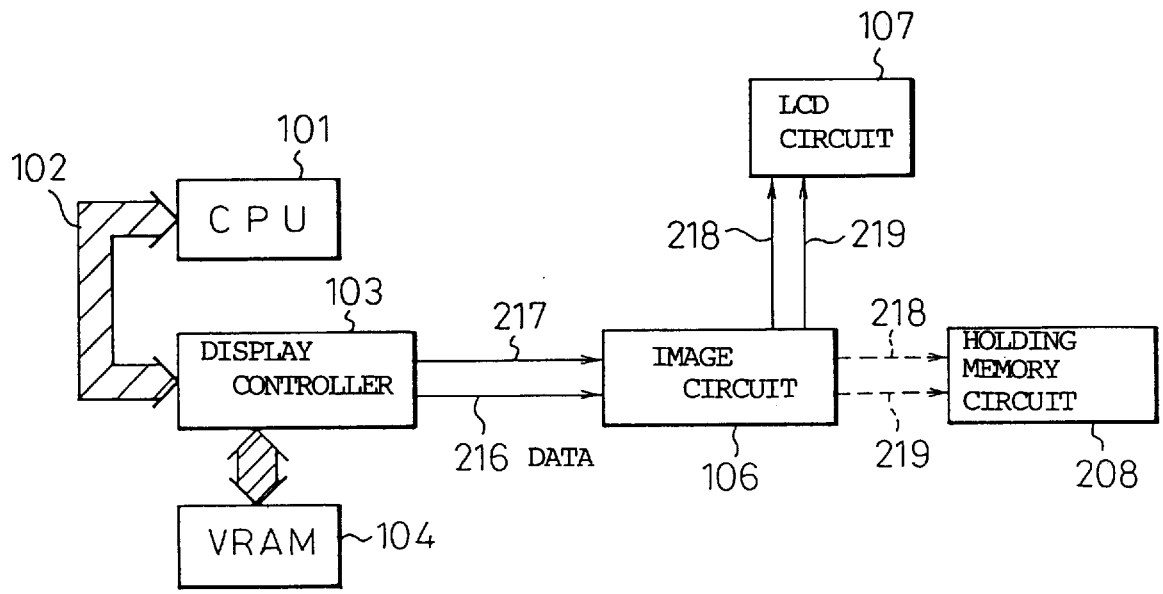
FIGS. 9 through 15 are respective illustrations for various operations in accordance with practical aspects of a liquid crystal display device of the present invention.

FIG. 9 shows a block diagram of an operational example of the normal mode based on the method (1) described above. Here, the CPU 101 corresponds to a central processing unit such as, for example, 80C88 made by Intel. The VRAM 104 is, as is well know, a video memory in which dynamic RAMs, etc., used for microcomputers are applied, and corresponds to the first image display storage circuit. The holding memory circuit 208 includes storage circuit elements such as dynamic RAMs, etc., for storing the LCD data 219, and corresponds to the second image display storage circuit 208 for displaying a still image. As the display controller 103, a circuit for microcomputers normally called a VGA controller is used and this corresponds to the display image generating circuit 103. The image circuit 106 plays a central role for controlling the system, and corresponds to the display image data controlling circuit. The LCD circuit 107 includes a display element and corresponds to the display device. The operation of the system according to this embodiment will be hereinafter described. Note that the CPU 101, display controller 103, VRAM 104 are connected by an address bus 102.

The display controller 103 scans the content of the VRAM 104 to execute operations to form image data, and converts thus obtained image data into LCD data 216 for the LCD. At the same time, the controller 103 sends out an LCD synchronizing signal 217 for driving the LCD. The display image data controlling circuit 106 transmits the LCD data 219 and the LCD synchronizing signal 218 to the LCD circuit 107, while sending the LCD data 219 and the LCD synchronizing signal 218 to the holding memory circuit 208.

The holding memory circuit 208 stores the LCD data 219 from the display image data controlling circuit 106 in the memory in accordance with the LCD synchronizing signal 218. The LCD circuit 107 displays on the LCD 107 the LCD data 219 from the display image data controlling circuit 106 in accordance with the LCD synchronizing signal 218. It should be noted that the transmission of the LCD data 219 and the LCD synchronizing signal 218 from the display image data controlling circuit 106 to the holding memory circuit 208 may be executed continuously or the content may be transmitted immediately before entering the saving mode.

Figure 10:
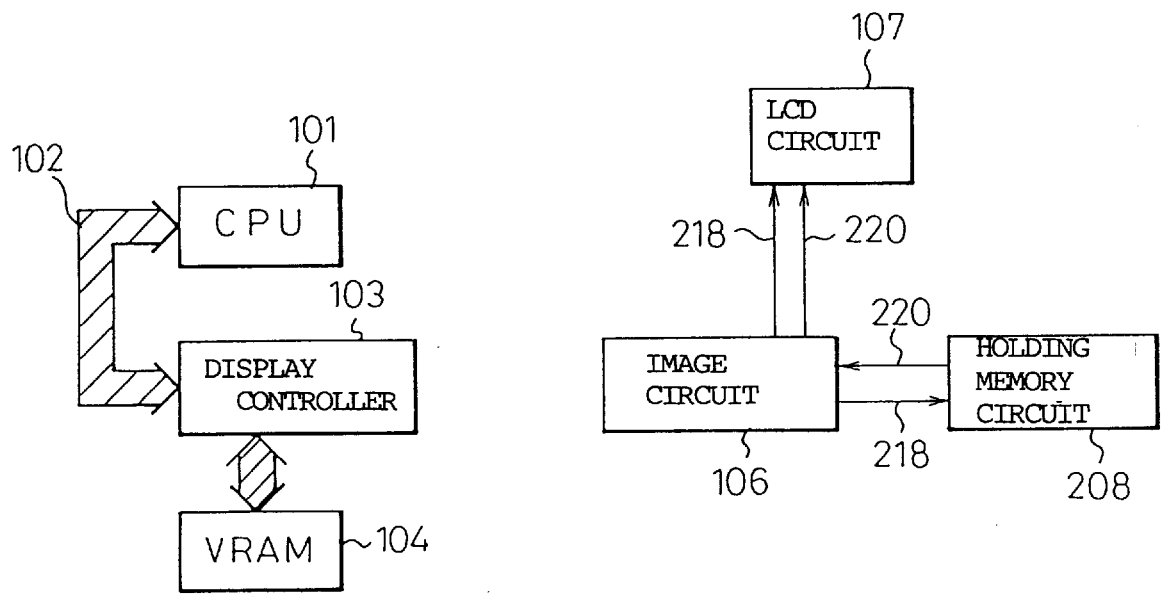

FIG. 10 is a block diagram showing an operation example in the saving mode based on the method (2) of the present invention. In this example, the display controller 103 is made to stop.

At that time, the content in the control register in the display controller 103 and the VRAM 104 are being held. The display imaged data controlling circuit 106 generates a dummy synchronization signal 218 and transmits it to the LCD circuit 107. At the same time, in synchronization with the dummy synchronizing signal 218, the circuit 106 repeatedly transmits the held LCD data 220 stored in the holding memory circuit 208 to the LCD circuit 107. The LCD circuit 107 displays on the LCD the held LCD data 220 sent from the dummy signal generating circuit 206 in the display image data controlling circuit 106, in accordance with the dummy LCD synchronizing signal 218.

Figure 11:
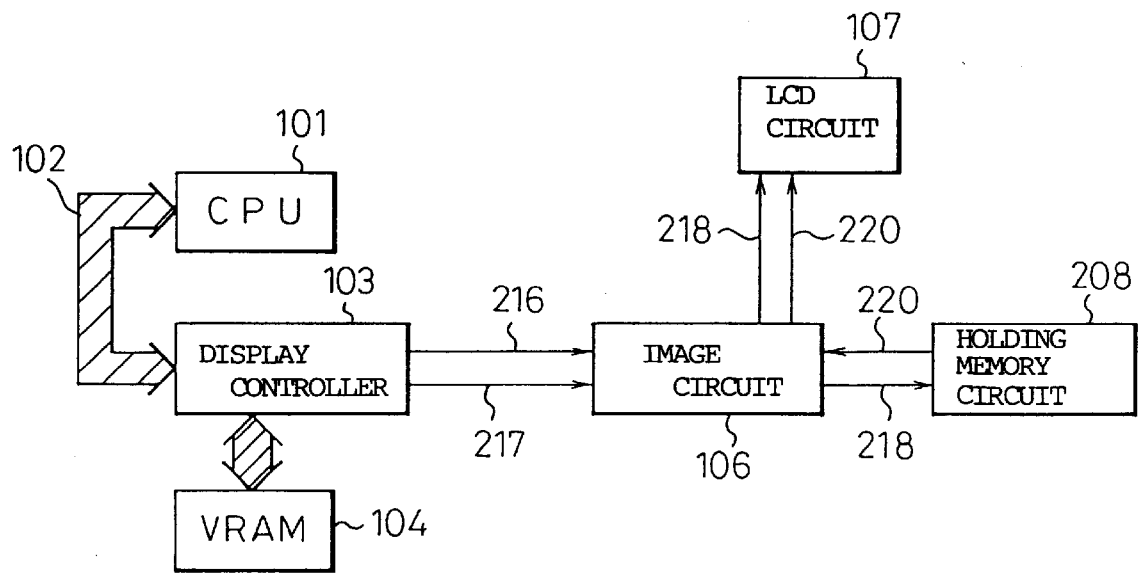

FIG. 11 is a block diagram showing an embodiment utilizing the changeover from the saving mode to the normal mode based on the method (3) according to the present invention. The display controller 103 is activated to scan the content in the VRAM 104 and executes predetermined operations. The controller 103 converts the image data obtained as a result of the operations into LCD data 216 for the LCD to send it out. Simultaneously, the controller 103 sends out an LCD synchronizing signal 217 for driving the LCD. The display image data controlling circuit 106 generates a dummy synchronizing signal 218 and sends it out to the LCD circuit 107. At the same time, in synchronization with the dummy synchronizing signal 218, the circuit 106 repeatedly transmits the held LCD data 220 stored in the holding memory circuit 208 to the LCD circuit 107. The LCD circuit 107 displays on the LCD 107 the held LCD data 220 sent from the display image data controlling circuit 106, in accordance with the dummy LCD synchronizing signal 218. This process is required because, during the passage from the activation of the display controller 103 until normal operation, it is necessary to provide a time for displaying in the saving mode while driving the display controller 103 and a time for applying the synchronizing signal to the LCD circuit 107 in time.

Figure 12:
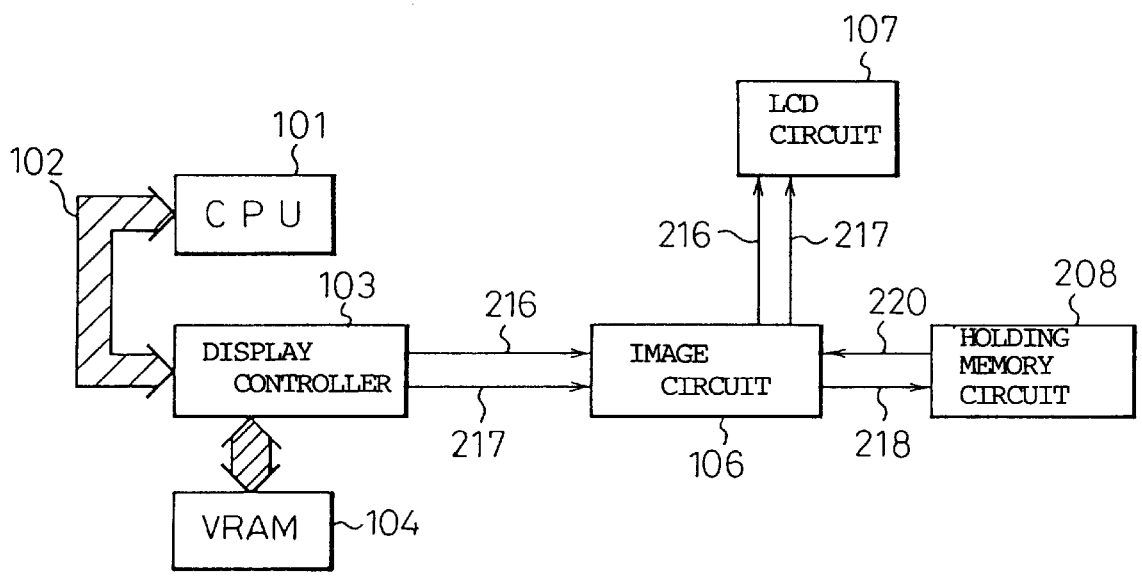

As an opposite case, FIG. 12 shows a block diagram for the method (4) in which the normal mode is replaced by the saving mode. The display controller 103 is driven to scan the content of the VRAM 104 and to execute predetermined operations. The image data obtained as a result of the operations are converted into LCD data 216 for the LCD to be output, at the same time an LCD synchronizing signal 217 for LCD driving is output. The holding memory circuit 208 generates the holding LCD data 220 to the image circuit 106 in accordance with a dummy synchronizing signal 218 generated from the display image data controlling circuit 106.

This process is carried out because it is necessary to provide a time for applying the synchronizing signal to the LCD circuit 107 in time.

The LCD circuit 107 displays on the LCD the LCD data 216 sent from the display image data controlling circuit 106 in accordance with the LCD synchronizing signal 217.

Figure 13:
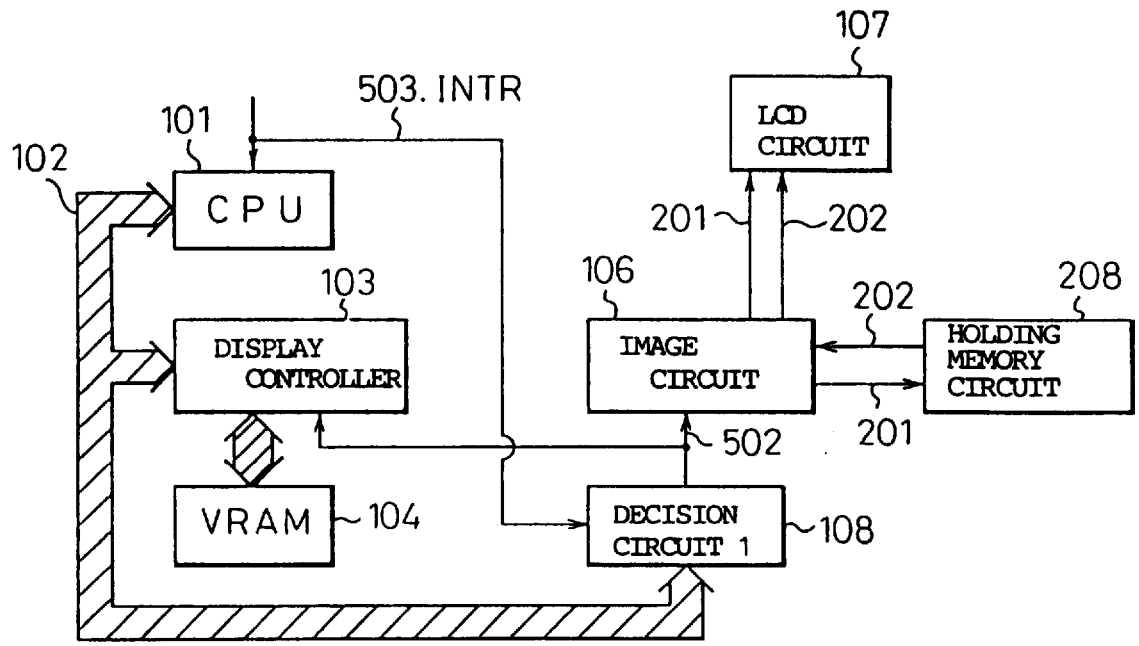

FIG. 13 is a block diagram showing an embodiment in which decision on the changeover between the saving mode and the normal mode is made, according to the method (5) of the present invention.

A decision circuit 108 for detecting access or interrupt monitors an interrupt signal INTR 503 to CPU and the address bus 102, and if the circuit 108 judges that there is no change for the display, it generates a decision signal 502 to switch the display into the saving mode. If the circuit 108 judges that there is a change for the display, it outputs a decision signal 502 to switch the display into the normal mode. Here, the criteria of the judgement include the access frequency to the VRAM 104, and the frequency of the INTR. In the figure, switching is carried out by hardware in accordance with the decision signal 502, but it is also possible to provide registers in the decision circuit and detect the signal periodically and effect the switching by software.

Figure 14:
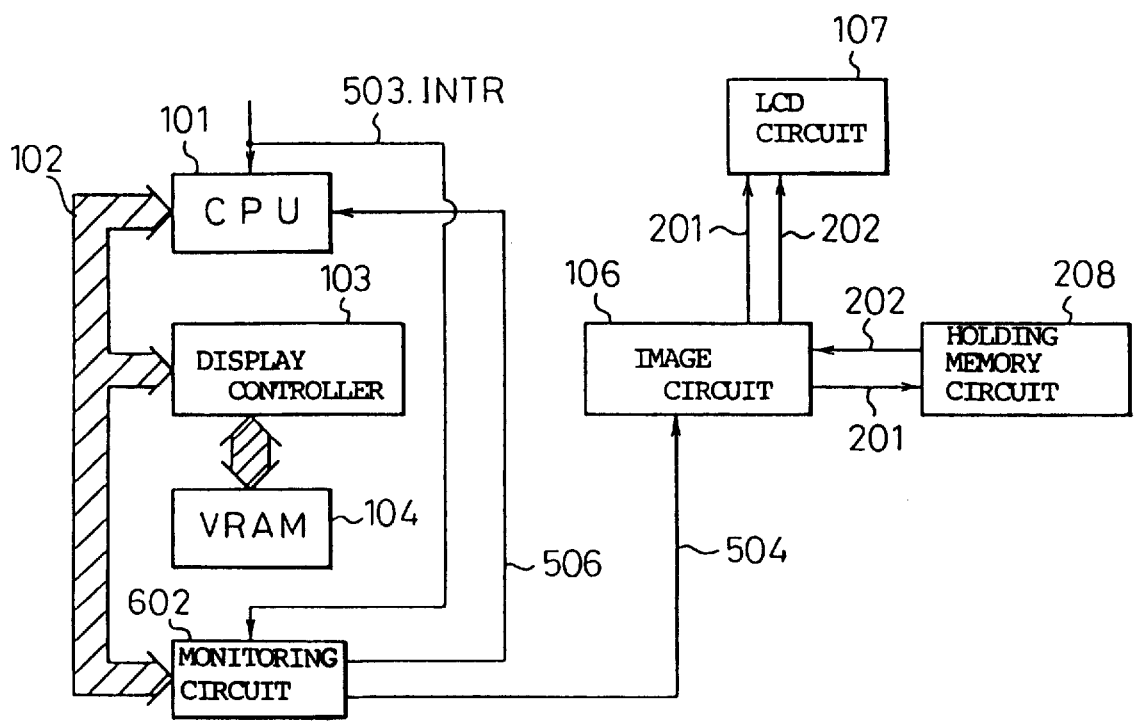

FIG. 14 is a block diagram showing another embodiment in which a decision on the changeover between the saving mode and the normal mode is made according to the method (6) of the present invention. A monitoring circuit 602 monitors an interrupt signal INTR 503 to CPU and the address bus, and if the circuit 602 judges that there is no change in the display, it generates a decision signal 504 to switch the display into the saving mode. If the circuit 602 judges that there is a change in the display, it outputs a decision signal 504 to switch the display into the normal mode. Further, the monitoring circuit 602 monitors an interrupt signal INTR 503 to CPU and the address bus and if the circuit 602 judges that there is no change in the input, it generates a decision signal 506 to switch the CPU into the saving mode. The criteria of the judgement include, in addition to items in the above embodiment, the frequency of access to an input/output function in the OS software. Saving power for the CPU also in this manner remarkably improves the power saving in the whole system operation.

Figure 15:
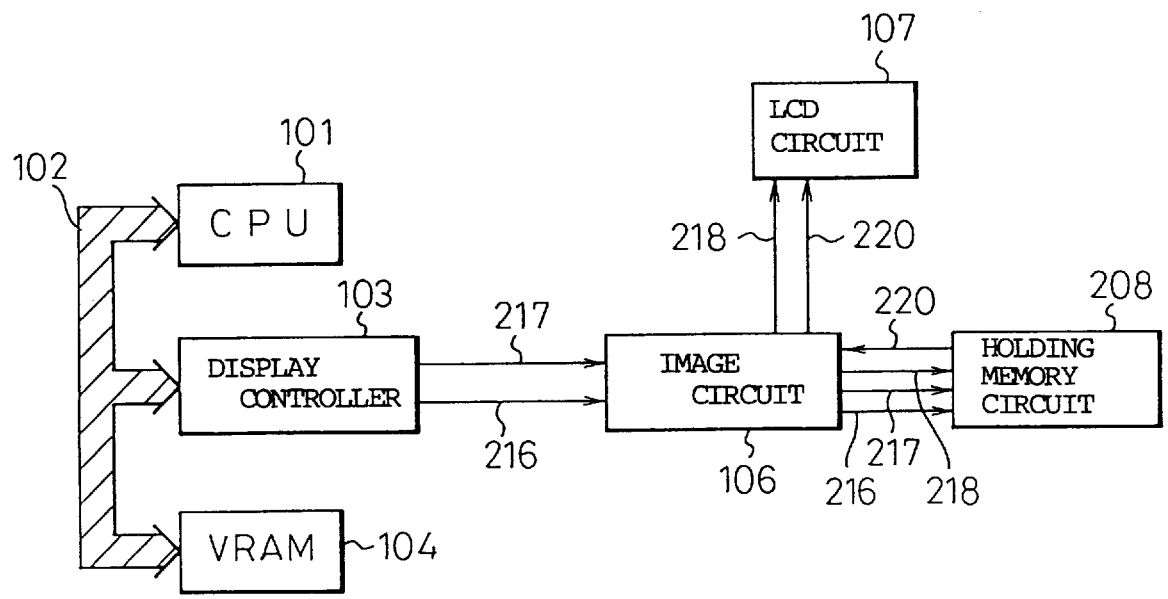

FIG. 15 is a view for explaining the method (7) based on the liquid crystal display device according to the present invention.

Specifically, in this embodiment, a liquid crystal display device comprises a central processing unit 101, a first image display storage circuit 104, a second image display storage circuit 208 for still image display, a display image generating circuit 103, a display controlling circuit 106 and a display element 107, and having two modes, that is, the normal electric power consumption display mode and the low electric power consumption display mode. In this arrangement, the still image data stored in the second image storage circuit 208 are displayed on the display element 107 in accordance with a dummy synchronizing signal newly generated from the display controlling unit, and the whole image data based on the data stored in the first image display storage circuit 104 sent out from the display image generating circuit 103, are stored in the second image display storage unit 208.

In the above low power consumption display system, the signal system to the LCD circuit 107 is changed over for input between the group of the LCD data 108 and the LCD synchronizing signal 109 and the group of the LCD holding data 202 and the dummy synchronizing signal 201. Therefore, an image circuit 105 becomes complicated. To deal with this, when the display controller 103 returns to the normal operation due to the change in the content of the VRAM 104 or some other reason, the LCD data 217 are stored in the holding memory 208 at the same time the content in the holding memory 208 is continuously transmitted to the LCD circuit 107. That is, the signal system to the LCD circuit 107 is always composed of only one group of the LCD holding data 220 and the dummy synchronizing signal 218.

According to the liquid crystal display device with the configuration stated above, the conventional low power system can be further simplified.

In the above system, there occurs a problem of display flickering when the driving signal 217 from the display controller 103 is replaced by the dummy driving signal 218, or when the dummy driving signal 218 is replaced by the driving signal 217 from the above display controller.

Therefore, it is necessary to provide a display device for personal computers which may provide a stable display and consume little electric power. To deal with this, according to this embodiment, in a liquid crystal display device having the above-stated configurations, there is provided a flicker protection circuit 700 which shuts off the display of the liquie crystal display element at the time of the changeover between the normal power consumption mode and the low power consumption mode, so that a stable display free from flickering may be effected.

Specifically, when, in the above system, the driving signal 217 from the display controller 103 is replaced by the dummy driving signal 218, or inversely when the dummy driving signal 218 is replaced by the driving signal 217 from the display controller, if the signals are switched without any treatment, the display flickers. This reason is that the scanning position directed by the display driving signal prior to the replacement does not correspond to the scanning position directed by the driving signal after the replacement. This is because immediately after the changeover until the vertical synchronizing signal is input, different display data in the same position are displayed.

To deal with this, there is an idea by which the vertical synchronizing signal before switching is made in time with the vertical synchronizing signal. This method, however, requires a relatively complicated circuit, and it is very difficult to obtain the timing of vertical synchronizing signals in the case where the dummy driving signal is replaced by the driving signal from the display controller.

Therefore, as shown in FIGS. 18 and 19, when a timing gap occurs between the LCD vertical synchronizing signal 701 and the LCD dummy vertical synchronizing signal 702, a drive suspension time span is implemented to halt the display. That is, in place of displaying the display data having an erroneous position, no display is made. This system is effective also when the dummy driving signal is switched to the suspension span-provided LCD driving signal 705 of the display controller. And if the drive suspension time span is shortened by increasing the frequency of the LCD dummy vertical synchronizing signal 702 or some other way, the flickering may be further improved.

Figure 17:
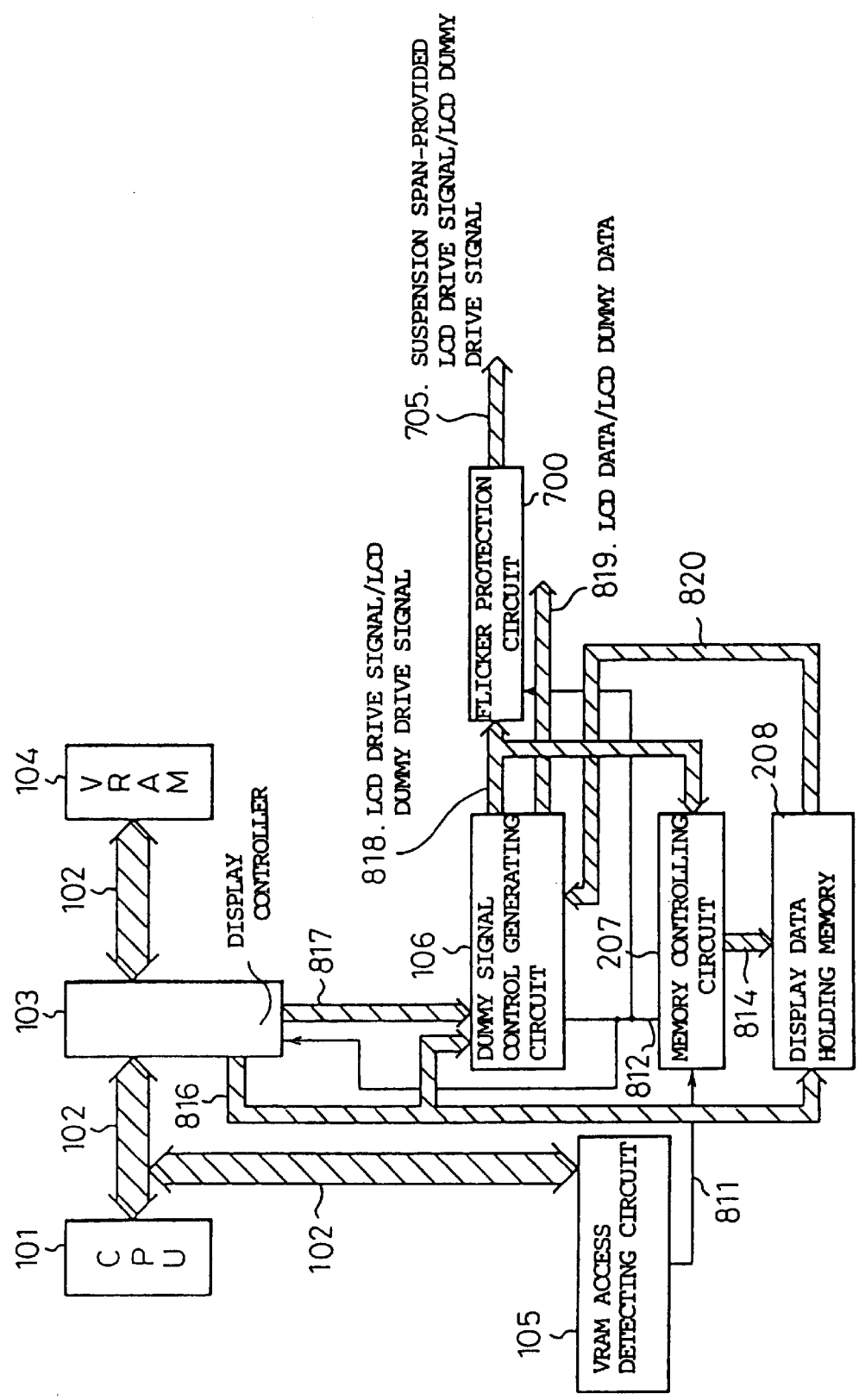
FIG. 17 is a block diagram showing a structure of a fourth embodiment of a liquid crystal display device of the present invention.

FIG. 17 is a block diagram showing the system according to this embodiment. Here, the flicker protection circuit 700 produces an LCD suspension span A707 (FIG. 18) while the display produced by the driving signal 817 for the display controller 103 is replaced with the display by the dummy driving signal 818 in a case where the power consumption mode signal 812 is changed from low level to high level. When the signal 812 is changed from high level to low level, the circuit 700 produces an LCD suspension span B717 (FIG. 19) during the time the display by the dummy driving signal 818 is replaced with the driving signal 817 for the display controller 103.

FIG. 18 shows a timing chart in the case where the display formed by the driving signal 817 from the display controller 103 is replaced with that formed by the dummy driving signal 818. Here, an LCD vertical synchronizing signal 701 is a vertical synchronizing signal for LCD driving generated from the display controller 103. An LCD dummy vertical synchronizing signal 702 is a vertical synchronizing signal for LCD driving while the display controller 103 operation is stopped. A suspension span-provided LCD driving signal/LCD dummy driving signal 705 indicates a signal generated from the display controller 103 for LCD driving. An LCD drive-suspending permission signal A703, only when it is at a high level, permits the changeover from the display by the driving signal 817 from the display controller 103 to the display by the dummy driving signal 818. The signal A703 can be raised to a high level at any time, but it will drop to a low level in synchronization with the LCD vertical synchronizing signal 702. An LCD drive suspension signal A704 is raised to a high level in a duration between the first transition of the LCD vertical synchronizing signal 701 and the first transition of the LCD dummy synchronizing signal 702, under the condition that the LCD drive-suspending permission signal A703 stays at a high level. While the LCD drive suspension signal A704 is at a high level, the LCD drive is suspended. Here, in the figure, reference numerals 706, and 708 designate the LCD display span produced by the LCD driving signal and the LCD display span produced by the dummy LCD driving signal, respectively. A numeral 707 designates the LCD drive suspension span produced by the drive suspension signal A704.

Here, increasing the frequency of the dummy vertical synchronizing signal 702 makes the LCD drive suspending span A707 short.

FIG. 19 shows a timing chart of an embodiment in the case where the display formed by the dummy driving signal 818 is replaced with that formed by the driving signal 818 from the display controller. Here, the same signals as shown in FIG. 18 are allotted the same numerals. An LCD drive-suspending permission signal B711, only when it is at a high level, permits the changeover from the LCD display by the dummy driving signal to the display by the LCD driving signal from the display controller. The signal B711 can be raised to a high level at any time, but it will drop to a low level in synchronization with the LCD vertical synchronizing signal 701. An LCD drive suspension signal B712 is raised to a high level in a duration between the first transition of the LCD dummy vertical synchronizing signal 702 and the first transition of the LCD synchronizing signal 701, under the condition that the LCD drive-suspending permission signal B711 stays at a high level. While the LCD drive suspension signal B712 is at a high level, the LCD drive suspension span B717 is derived.

Here, it is required as a premise that the first transition of the LCD dummy synchronizing signal 702 is included during the time the LCD drive-suspending permission signal B711 is at a high level, or the frequency of the LCD dummy vertical synchronizing signal 702 is higher than that of the LCD vertical synchronizing signal 701. On the other hand, it is possible to shorten the period of time that the LCD drive suspension signal B712 stays at a high level by delaying the first transition of the LCD drive-suspending permission signal B711. At this time, however, since it is required that the first transition of the LCD dummy vertical synchronizing signal 702 should be included during the time the LCD drive-suspending permission signal B711 stays at a high level, it is necessary to increase the frequency of the LCD dummy vertical synchronizing signal 702 during a time at least from the first transition of the LCD drive-suspending permission signal B711 to the first transition of the LCD dummy vertical synchronizing signal 702.

According to this embodiment, in the display device in which the power consumption is reduced by halting the display controller, when the display produced by the driving signal from the display controller is replaced with the display by the dummy driving signal, or vice versa, it is possible to obtain a stable display with low power consumption and free from flicker.

I claim:

1. A device having a central processing unit responsive to the entry of data from an external source for displaying image data on a liquid crystal display, comprising:

a source of electrical power;

switching means coupled to the source of electrical power and the display for placing the device either in a normal power operation or a lower-than-normal power operation;

means for generating standard image data;

first means for storing the generated standard image data in a first memory;

means for converting the standard image data to obtain liquid crystal image data;

second means for receiving and storing in a second memory the liquid crystal image data having a same amount of display as said standard image data, said second storing means storing the liquid crystal image data during both the normal power operation and the lower-than-normal power operation;

means for generating a synchronizing signal;

means responsive to the synchronizing signal for displaying the liquid crystal image data stored in the second memory when the device has been placed in a lower-than-normal power operation; and the source of electrical power in a lower-than-normal power operation being applied only to the second storing means, the means for generating a synchronizing signal, and the means responsive to the synchronizing signal for displaying the liquid crystal image data.

2. A display device, comprising:

a liquid crystal display cell;

a power source;

a central processing unit;

a power mode control circuit responsive to activity of the central processing unit and including a switching means for operating the device in either a normal power operation or a lower-than-normal power operation;

image generating means for generating standard image data corresponding to an amount of display in response to an output signal from the central processing unit;

first image storage means, responsive to said image generating means, for storing the generated standard image data;

image signal controlling means connected to said first image storage means for converting the standard image data from the first storage means to obtain liquid crystal image data having said same amount of display as the standard image data, and for driving said liquid crystal display cell during normal power operation to display the standard liquid crystal image data;

second image storing means connected to the image generating means for storing said liquid crystal image data, means for driving said liquid crystal display cell to display said same amount of display for the liquid crystal data from the second storage means upon switching of the device to a lower-than-normal power operation; and the power source in a lower-than-normal power operation being applied only to the second image storing means and the driving means.

3. The device of claim 2 wherein the means for driving the liquid crystal display cell during lower-than-normal power operation includes means for generating a dummy drive signal for driving the liquid crystal display cell at times when the switching means is in the lower-than-normal power operation; and comprises means for synchronizing the display of liquid crystal image data stored in the second image storing means with the generation of the dummy drive signal.

4. The device of claim 2 further comprising means for stopping operation of the image generating means following the switching between the normal power operation and the lower-than-normal power operation by the switching means.

5. The device of claim 2 wherein the central processing unit comprises:

means for detecting an external input signal accessing at least one of the means for generating standard image data and the first image storage means for storing the generated standard image data;

means for detecting the accessing frequency per unit of time, means for comparing the accessing frequency value with a reference value; and wherein the switching means switches from the normal power operation to the lower-than-normal power operation at times when the accessing frequency value is lower than the reference value.

6. The device of claim 2 wherein the central processing unit comprises:

means for detecting an external interrupt of at least one of said first means for storing generated display data and means for generating standard image data, means for calculating the frequency of detecting the external interrupts per unit of time, means for comparing the frequency value of the interrupts with a reference value, and wherein the switching means switches from the normal power operation to the lower-than-normal power operation at times when the frequency value of the interrupts becomes lower than the reference value.

7. The display device of claim 2 comprising means for displaying the liquid crystal image data stored in the second storage means at times when the standared image data is unchanged in the first storage means.

* * * * *